United States Patent
Suzuki et al.

(10) Patent No.: US 10,302,921 B2
(45) Date of Patent: May 28, 2019

(54) ZOOM LENS SYSTEM, IMAGING APPARATUS AND CAMERA

(71) Applicant: Panasonic Intellectual Property Management Co., Ltd., Osaka (JP)

(72) Inventors: Hiroaki Suzuki, Osaka (JP); Yoshiaki Kurioka, Osaka (JP); Takehiro Nishioka, Nara (JP); Hisayuki Il, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/666,874

(22) Filed: Aug. 2, 2017

(65) Prior Publication Data

US 2018/0081156 A1    Mar. 22, 2018

(30) Foreign Application Priority Data

Sep. 16, 2016  (JP) .................................. 2016-181078

(51) Int. Cl.
*G02B 13/00* (2006.01)
*G02B 15/20* (2006.01)
(Continued)

(52) U.S. Cl.
CPC ......... *G02B 15/20* (2013.01); *G02B 13/0045* (2013.01); *G02B 15/173* (2013.01);
(Continued)

(58) Field of Classification Search
CPC .. G02B 15/173; G02B 15/177; G02B 27/646; G02B 15/14; G02B 13/18; G02B 13/009;
(Continued)

(56) References Cited

U.S. PATENT DOCUMENTS 5,978,150 A  * 11/1999  Hamanishi ........... G02B 15/173
                                                            359/683
2011/0080652 A1  4/2011  Nakayama et al.
(Continued)

FOREIGN PATENT DOCUMENTS

JP    8-327905    12/1996
JP    2988164 B   12/1999
(Continued)

*Primary Examiner* — Evan P Dzierzynski
*Assistant Examiner* — Sharrief I Broome
(74) *Attorney, Agent, or Firm* — Wenderoth, Lind & Ponack, L.L.P.

(57) ABSTRACT

A zoom lens system comprises, in order from an object side to an image side: a first lens group having a positive power; a second lens group having a negative power; an aperture stop, a third lens group having a positive power; and a fourth lens group having a negative power. During zooming, a total length of the zoom lens system does not change, while a distance between each adjacent two of the lens groups changes, and the aperture stop moves along an optical axis independently of the second lens group and the third lens group. The zoom lens system satisfies condition (1) $6.0<f1/fw<20.0$ and condition (2) $0.5<|f4|/fw<4.0$, where f1 is a focal length of the first lens group, f4 is a focal length of the fourth lens group, and fw is a focal length of the zoom lens system at a wide-angle limit.

12 Claims, 10 Drawing Sheets

(51) Int. Cl.
  *G03B 17/14*    (2006.01)
  *H04N 5/225*    (2006.01)
  *H04N 5/232*    (2006.01)
  *G02B 15/173*   (2006.01)

(52) U.S. Cl.
  CPC ....... *H04N 5/2254* (2013.01); *H04N 5/23296* (2013.01); *G03B 17/14* (2013.01)

(58) Field of Classification Search
  CPC .... G02B 15/17; G02B 13/0045; G02B 13/02; G02B 27/64; G02B 5/04; G02B 7/102; G02B 13/0065; G02B 13/04; G02B 15/161; G02B 17/0896; G02B 26/004
  See application file for complete search history.

(56) References Cited

U.S. PATENT DOCUMENTS

| | | | | |
|---|---|---|---|---|
| 2011/0216423 | A1* | 9/2011 | Eguchi | G02B 15/14 359/684 |
| 2013/0258130 | A1* | 10/2013 | Mihara | G02B 15/14 348/222.1 |
| 2015/0085153 | A1* | 3/2015 | Souma | G02B 27/0062 348/220.1 |

FOREIGN PATENT DOCUMENTS

| | | |
|---|---|---|
| JP | 2007-264395 | 10/2007 |
| JP | 2011-081112 | 4/2011 |

* cited by examiner

ZOOM LENS SYSTEM, IMAGING APPARATUS AND CAMERA

BACKGROUND

1. Technical Field

The present disclosure relates to a small-size, high-performance zoom lens system, and an imaging apparatus using the zoom lens system.

2. Description of the Related Art

Japanese Patent No. 2988164 discloses a zoom lens which has, in order from an object side, a first group having a positive refractive power, a second group having a negative refractive power, an aperture stop, a third group having a positive refractive power, a fourth group having a negative refractive power. This zoom lens operates, during zooming, such that the aperture stop moves, while the first group is fixed.

SUMMARY

An object of the present disclosure is to provide a small-size, high-performance zoom lens system, an imaging apparatus using the zoom lens system, and a camera using the zoom lens system.

In an aspect of the present disclosure, a zoom lens system comprises, in order from an object side to an image side: a first lens group having a positive power; a second lens group having a negative power; an aperture stop, a third lens group having a positive power; and a fourth lens group having a negative power. During zooming, a total length of the zoom lens system does not change, while a distance between each adjacent two of the first through fourth lens groups changes, and the aperture stop moves along an optical axis independently of the second lens group and the third lens group. The zoom lens system satisfies the following conditions (1) and (2):

$$6.0 < f1/fw < 20.0 \quad (1)$$

$$0.5 < |f4|/fw < 4.0 \quad (2)$$

where
f1 is a focal length of the first lens group,
f4 is a focal length of the fourth lens group, and
fw is a focal length of the zoom lens system at a wide-anglelimit.

DETAILED DESCRIPTION

Figure 1:
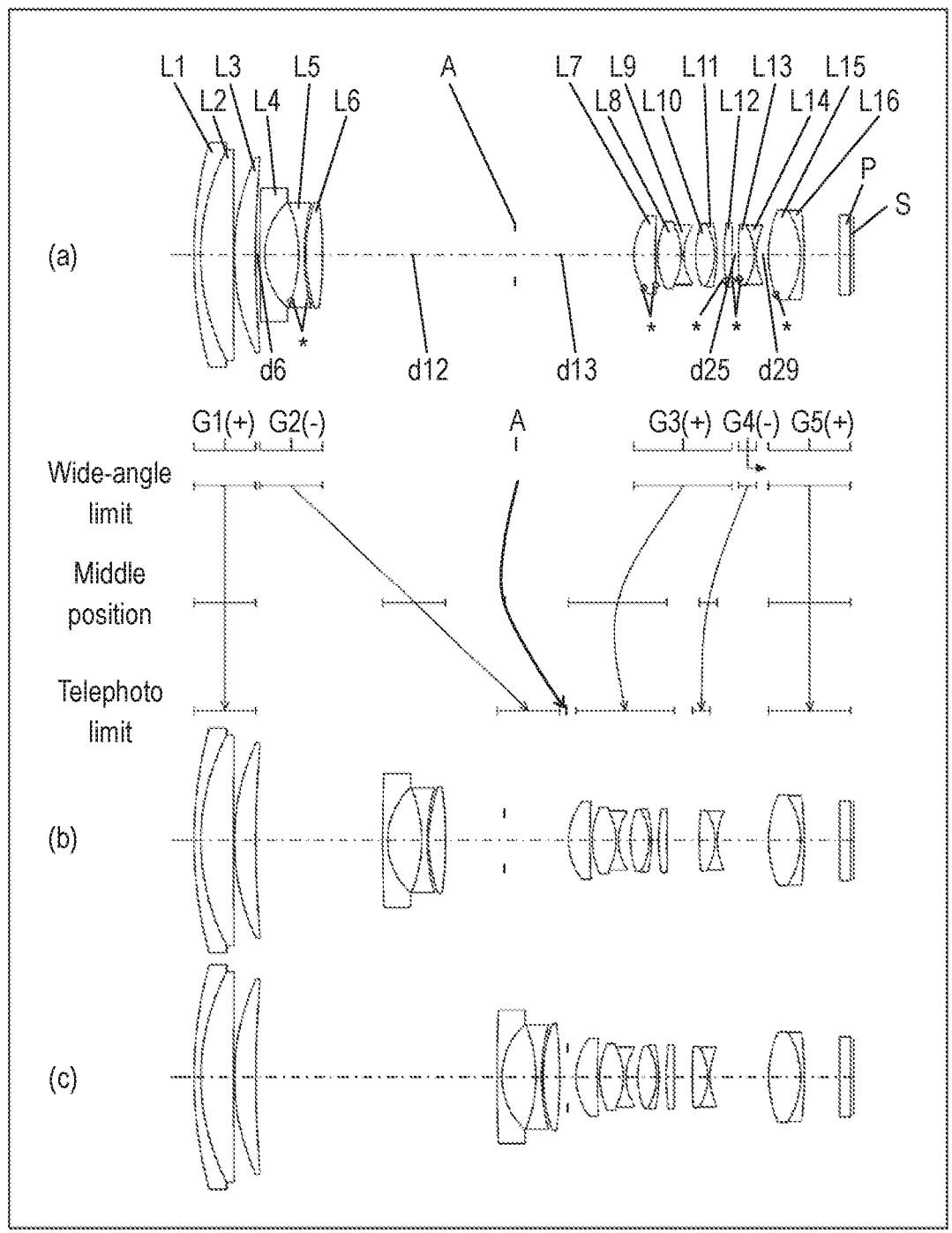
FIG. 1 illustrates lens layout diagrams in an infinity focus state of a zoom lens system according to a first exemplary embodiment (Numerical Example 1)
Figure 2:
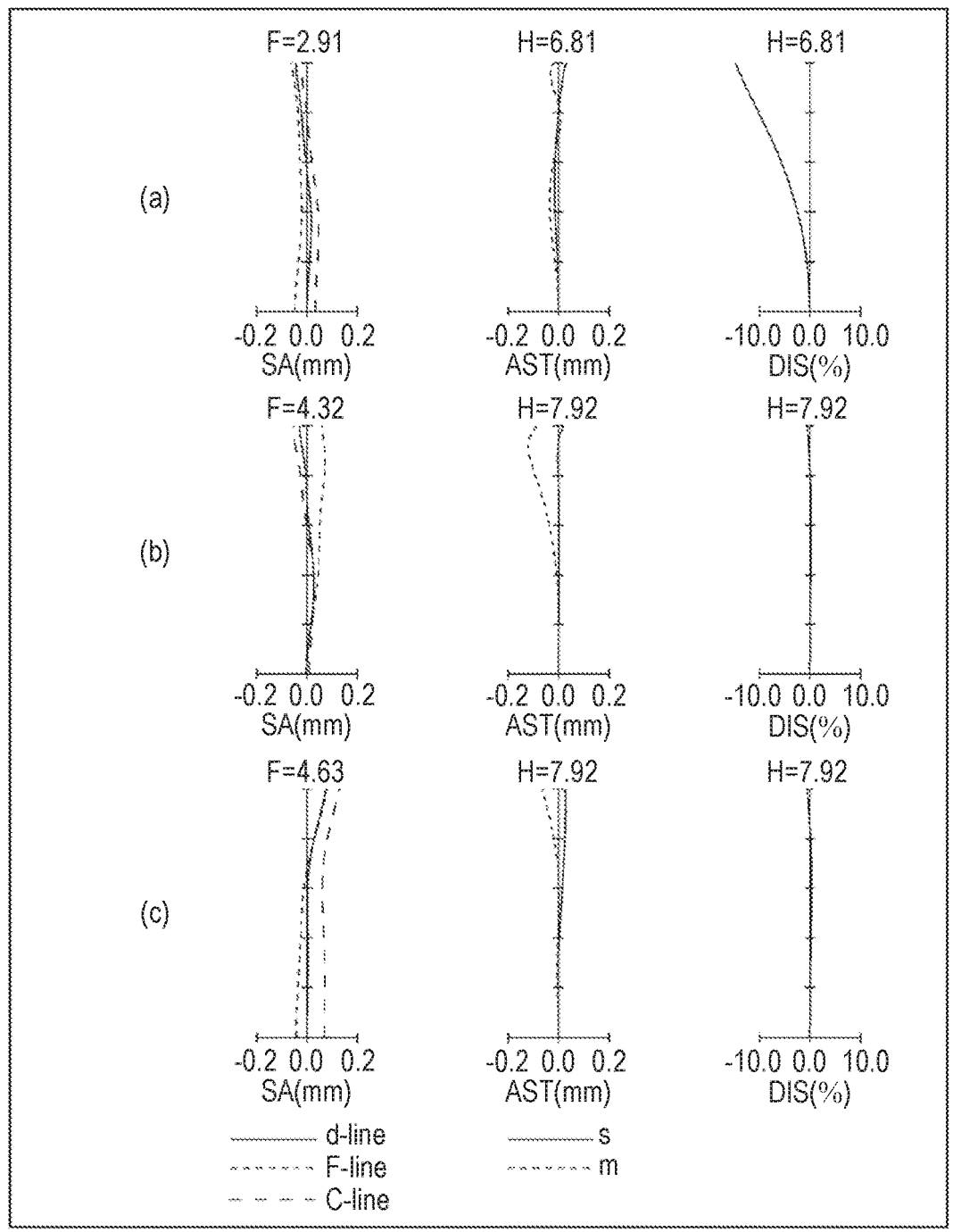
FIG. 2 illustrates longitudinal aberration diagrams in the infinity focus state of the zoom lens system according to the first exemplary embodiment.

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the disclosed embodiments.

Also, it should be noted that the following description and the accompanying drawings are provided to allow any person skilled in the art to fully understand the present disclosure, and that it is not intended to limit the subject matter described in the claims by the following description.

First Through Fourth Exemplary Embodiments

FIGS. 1, 3, 5 and 7 illustrate layout diagrams of zoom lens systems, each being in an infinity focus state, according to first through fourth exemplary embodiments, respectively.

In each of FIGS. 1, 3, 5 and 7, diagram (a) shows a lens configuration at a wide-angle limit (a minimum focal length state: focal length fW), diagram (b) shows a lens configuration at a middle position (a middle focal length state: focal length fM=√(fW*fT)), and diagram (c) shows a lens configuration at a telephoto limit (a maximum focal length state: focal length fT). The lens configurations in diagrams (a), (b) and (c) are drawn at the same aspect ratio.

Also, in each of FIGS. 1, 3, 5 and 7, each of polygonal line arrows between diagram (a) and diagram (b) is obtained by connecting with straight lines positions of a corresponding lens group in the states at the wide-angle limit, the middle position, and the telephoto limit in order from the top. The positions at the wide-angle limit and at the middle position are simply connected by a straight line, and the positions at the middle position and at the telephoto limit are also simply connected with a straight line. Thus, the movements of each lens group indicated by these lines differs from actual movements of the lens group.

Also, in each of FIGS. 1, 3, 5 and 7, an arrow added to a lens group indicates focusing from the infinity focus state to a proximity focus state. Meanwhile, in each of FIGS. 1, 3, 5 and 7, since reference marks of the lens groups are written below the respective lens positions illustrated in diagram (a), an arrow that indicates focusing is added below the reference mark of a corresponding lens group for convenience. However, respective moving directions of the lens groups during focusing in each zooming state will be specifically described later in each of the exemplary embodiments.

In FIGS. 1, 3, 5 and 7, asterisks "*" added to some surfaces indicate that the surfaces with asterisks are aspherical surfaces. Also, in each of FIGS. 1, 3, 5 and 7, symbols "(+)" and "(−)" added to the reference marks of the lens groups correspond to the signs of the powers of the lens groups. Also, in each of FIGS. 1, 3, 5 and 7, a line at the rightmost end represents the position of image surface S (a surface of an image sensor facing an object side).

First Exemplary Embodiment

FIG. 1 illustrates a zoom lens system according to a first exemplary embodiment.

The zoom lens system is configured by, in order from an object side to an image side, first lens group G1 having a positive power, second lens group G2 having a negative power, aperture stop A, third lens group G3 having a positive power, fourth lens group G4 having a negative power, fifth lens group G5 having a positive power, and planar parallel plate P. Fifth lens group G5 constitutes a succeeding rear lens group.

First lens group G1 is configured by, in order from the object side to the image side, first lens element L1 having a negative power, second lens element L2 having a positive power, and third lens element L3 having a positive power. First lens element L1 and second lens element L2 are bonded by, for example, an adhesive to constitute a cemented doublet lens.

Second lens group G2 is configured by, in order from the object side to the image side, fourth lens element L4 having a negative power, fifth lens element L5 having a negative power, and sixth lens element L6 having a positive power.

Third lens group G3 is configured by, in order from the object side to the image side, seventh lens element L7 having a positive power, eighth lens element L8 having a positive power, ninth lens element L9 having a negative power, tenth lens element L10 having a positive power, eleventh lens element L11 having a negative power, and twelfth lens element L12 having a positive power. Eighth lens element L8 and ninth lens element L9 are bonded by, for example, an adhesive to constitute a cemented doublet lens. Tenth lens element L10 and eleventh lens element L11 are bonded by, for example, an adhesive to constitute a cemented doublet lens.

Fourth lens group G4 is configured by, in order from the object side to the image side, thirteenth lens element L13 having a positive power, and fourteenth lens element L14 having a negative power. Thirteenth lens element L13 and fourteenth lens element L14 are bonded by, for example, an adhesive to constitute a cemented doublet lens.

Fifth lens group G5 is configured by, in order from the object side to the image side, fifteenth lens element L15 having a positive power, and sixteenth lens element L16 having a negative power. Fifteenth lens element L15 and sixteenth lens element L16 are bonded by, for example, an adhesive to constitute a cemented doublet lens.

Aperture stop A is located between six lens element L6 and seventh lens element L7.

Each of the lens elements will now be described.

The lens elements in first lens group G1 will be described. First lens element L1 is a meniscus lens having a convex surface facing the object side. Second lens element L2 is a meniscus lens having a convex surface facing the object side. Third lens element L3 is a meniscus lens having a convex surface facing the object side.

The lens elements in second lens group G2 will be described. Fourth lens element L4 is a meniscus lens having a convex surface facing the object side. Fifth lens element L5 is a double-concave lens having opposite concave surfaces each of which is an aspherical surface. Sixth lens element L6 is a double-convex lens.

The lens elements in third lens group G3 will be described. Seventh lens element L7 is a meniscus lens having a convex surface facing the object side, and has aspherical surfaces on both of its opposite surfaces. Eighth lens element L8 is a double-convex lens. Ninth lens element L9 is a double-concave lens. Tenth lens element L10 is a double-convex lens. Eleventh lens L11 is a meniscus lens having a concave surface facing the object side. Twelfth lens element L12 is a meniscus lens having a convex surface facing the object side, and has aspherical surfaces on both of its opposite surfaces.

The lens element in fourth lens group G4 will be described. Thirteenth lens element L13 is a double-convex lens having an aspherical surface facing the object side. Fourteenth lens element L14 is a double-concave lens.

The lens element in fifth lens group G5 will be described. Fifteenth lens element L15 is a double-convex lens having an aspherical surface facing the object side. Sixteenth lens element L16 is a meniscus lens having a concave surface facing the object side.

In the zoom lens system, during zooming from a wide-angle limit to a telephoto limit in image shooting, first lens group G1 does not move, second lens group G2 moves toward the image surface side, aperture stop A moves to form a locus that is convex toward the object side, third lens group G3 moves to form a locus that is convex toward the object side, fourth lens group G4 moves toward the object side, and fifth lens group G5 does not move. That is, during zooming, the lens groups move along an optical axis in such a manner that a distance between first lens group G1 and second lens group G2 increases, a distance between second lens group G2 and aperture stop A decreases, a distance between aperture stop A and third lens group L3 decreases, a distance between third lens group G3 and fourth lens group G4 increases in the range from the wide-angle limit to the middle position and decreases in the range from the middle position to the telephoto limit, and a distance between fourth lens group G4 and fifth lens group G5 increases. Also, as shown in FIG. 1, during zooming from the wide-angle limit to the telephoto limit, the aperture diameter of aperture stop A is the same at the wide-angle limit and at the middle position, but becomes larger at the telephoto limit than at the middle position.

In the zoom lens system, during focusing from the infinity focus state to the proximity focus state, fourth lens group G4 moves toward the image side along the optical axis as indicated by the arrow below G4 in FIG. 1.

Second Exemplary Embodiment

Figure 3:
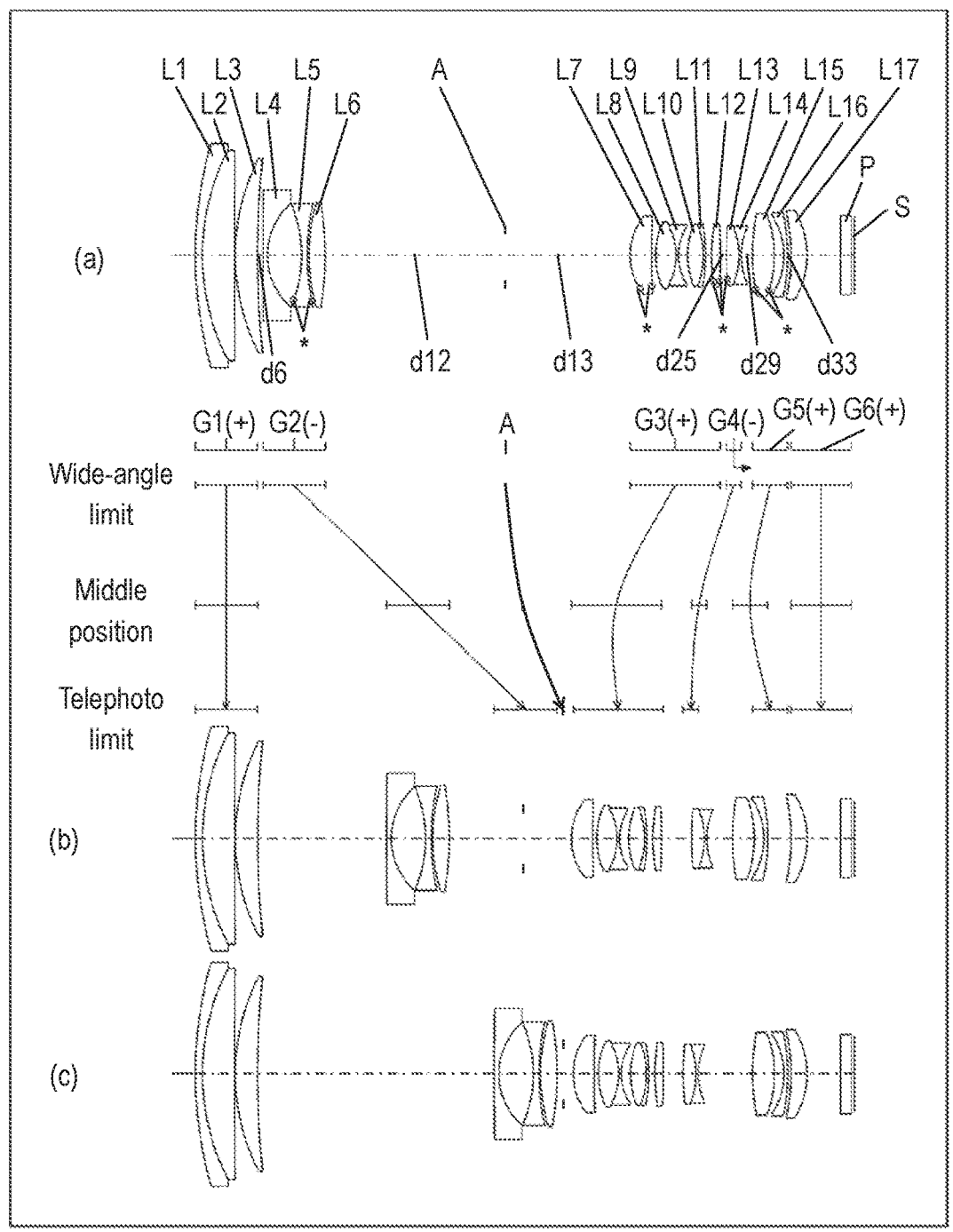
FIG. 3 illustrates lens layout diagrams in an infinity focus state of a zoom lens system according to a second exemplary embodiment (Numerical Example 2)
Figure 4:
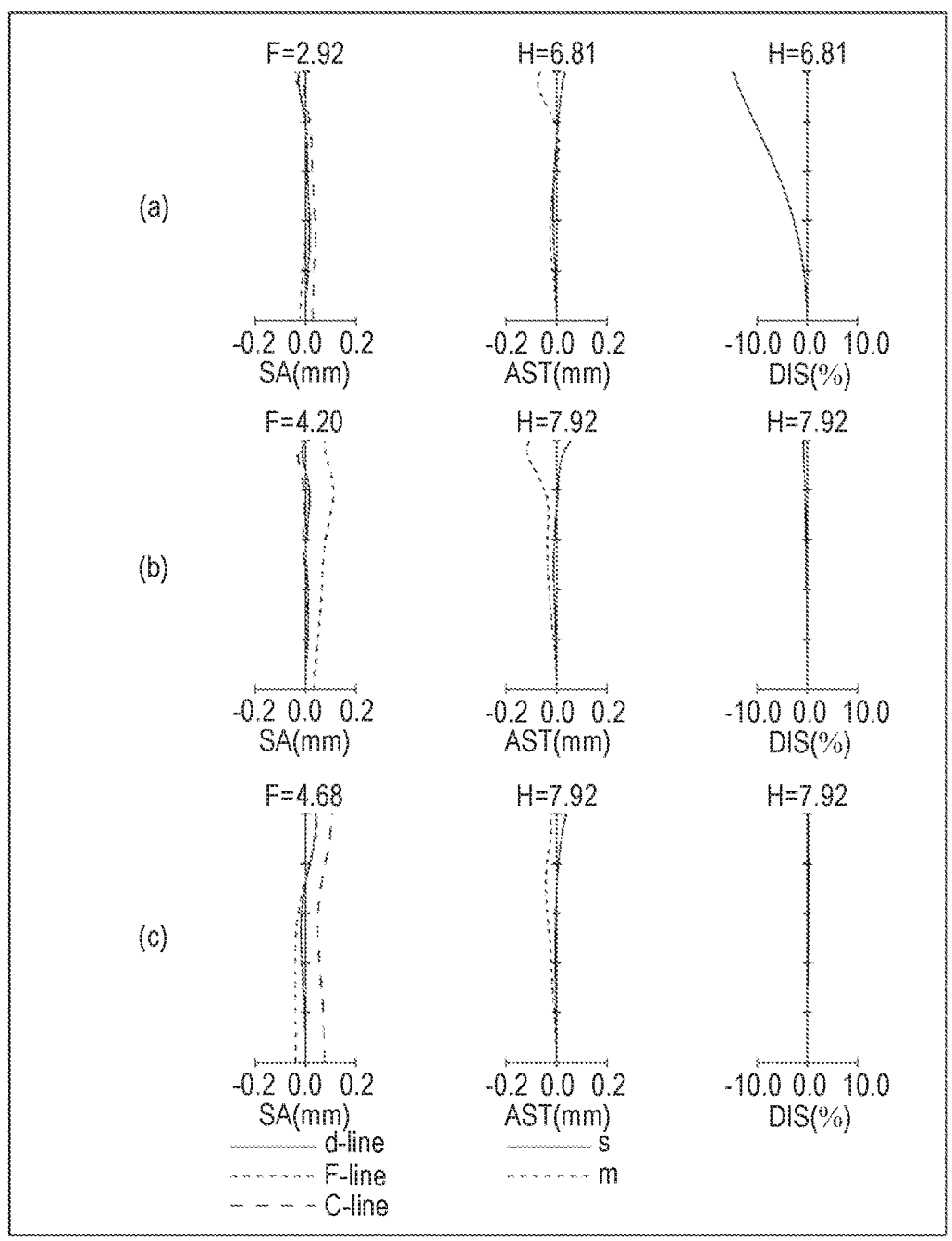
FIG. 4 illustrates longitudinal aberration diagrams in the infinity focus state of the zoom lens system according to the second exemplary embodiment.

FIG. 3 illustrates a zoom lens system according to a second exemplary embodiment.

The zoom lens system is configured by, in order from an object side to an image side, first lens group G1 having a positive power, second lens group G2 having a negative power, aperture stop A, third lens group G3 having a positive power, fourth lens group G4 having a negative power, fifth lens group G5 having a positive power, sixth lens group G6 having a positive power, and planar parallel plate P. Fifth lens group G5 and sixth lens group G6 constitute succeeding lens groups.

First lens group G1 is configured by, in order from the object side to the image side, first lens element L1 having a negative power, second lens element L2 having a positive power, and third lens element L3 having a positive power. First lens element L1 and second lens element L2 are bonded by, for example, an adhesive to constitute a cemented doublet lens.

Second lens group G2 is configured by, in order from the object side to the image side, fourth lens element L4 having a negative power, fifth lens element L5 having a negative power, and sixth lens element L6 having a positive power.

Third lens group G3 is configured by, in order from the object side to the image side, seventh lens element L7 having a positive power, eighth lens element L8 having a positive power, ninth lens element L9 having a negative power, tenth lens element L10 having a positive power, eleventh lens element L11 having a negative power, and twelfth lens element L12 having a positive power. Eighth lens element L8 and ninth lens element L9 are bonded by, for example, an adhesive to constitute a cemented doublet lens. Tenth lens element L10 and eleventh lens element L11 are bonded by, for example, an adhesive to constitute a cemented doublet lens.

Fourth lens group G4 is configured by, in order from the object side to the image side, thirteenth lens element L13 having a positive power, and fourteenth lens element L14 having a negative power. Thirteenth lens element L13 and fourteenth lens element L14 are bonded by, for example, an adhesive to constitute a cemented doublet lens.

Fifth lens group G5 is configured by, in order from the object side to the image side, fifteenth lens element L15 having a positive power, and sixteenth lens element L16 having a negative power.

Sixth lens group G6 is configured by seventeenth lens element L17 having a positive power.

Aperture stop A is located between six lens element L6 and seventh lens element L7.

Each of the lens elements will now be described.

The lens elements in first lens group G1 will be described. First lens element L1 is a meniscus lens having a convex surface facing the object side. Second lens element L2 is a meniscus lens having a convex surface facing the object side. Third lens element L3 is a meniscus lens having a convex surface facing the object side.

The lens elements in second lens group G2 will be described. Fourth lens element L4 is a meniscus lens having a convex surface facing the object side. Fifth lens element L5 is a double-concave lens having opposite concave surfaces each of which is an aspherical surface. Sixth lens element L6 is a double-convex lens.

The lens elements in third lens group G3 will be described. Seventh lens element L7 is a meniscus lens having a convex surface facing the object side, and has aspherical surfaces on both of its opposite surfaces. Eighth lens element L8 is a double-convex lens. Ninth lens element L9 is a double-concave lens. Tenth lens element L10 is a double-convex lens. Eleventh lens L11 is a meniscus lens having a concave surface facing the object side. Twelfth lens element L12 is a meniscus lens having a convex surface facing the object side, and has aspherical surfaces on both of its opposite surfaces.

The lens element in fourth lens group G4 will be described. Thirteenth lens element L13 is a double-convex lens having an aspherical surface facing the object side. Fourteenth lens element L14 is a double-concave lens.

The lens element in fifth lens group G5 will be described. Fifteenth lens element L15 is a double-convex lens having opposite convex surfaces each of which is an aspherical surface. Sixteenth lens element L16 is a meniscus lens having a concave surface facing the object side.

The lens element in sixth lens group G6 will be described. Seventeenth lens element L17 is a meniscus lens having a concave surface facing the object side.

In the zoom lens system, during zooming from a wide-angle limit to a telephoto limit in image shooting, first lens group G1 does not move, second lens group G2 moves toward the image surface side, aperture stop A moves toward the image surface side, third lens group G3 moves to form a locus that is convex toward the object side, fourth lens group G4 moves toward the object side, fifth lens group G5 moves to form a locus that is convex toward the object side, and sixth lens group G6 does not move. That is, during zooming, the lens groups move along an optical axis in such a manner that a distance between first lens group G1 and second lens group G2 increases, a distance between second lens group G2 and aperture stop A decreases, a distance between aperture stop A and third lens group L3 decreases, a distance between third lens group G3 and fourth lens group G4 increases in the range from the wide-angle limit to the middle position and decreases in the range from the middle position to the telephoto limit, a distance between fourth lens group G4 and fifth lens group G5 increases, and a distance between fifth lens group G5 and sixth lens group G6 increases in the range from the wide-angle limit to the middle position and decreases in the range from the middle position to the telephoto limit. Also, as shown in FIG. 3, during zooming from the wide-angle limit to the telephoto limit, the aperture diameter of aperture stop A becomes larger at the middle position than at the wide-angle limit, but is the same at the middle position and the telephoto limit.

In the zoom lens system, during focusing from the infinity focus state to the proximity focus state, fourth lens group G4 moves toward the image side along the optical axis as indicated by the arrow below G4 in FIG. 3.

Third Exemplary Embodiment

Figure 5:
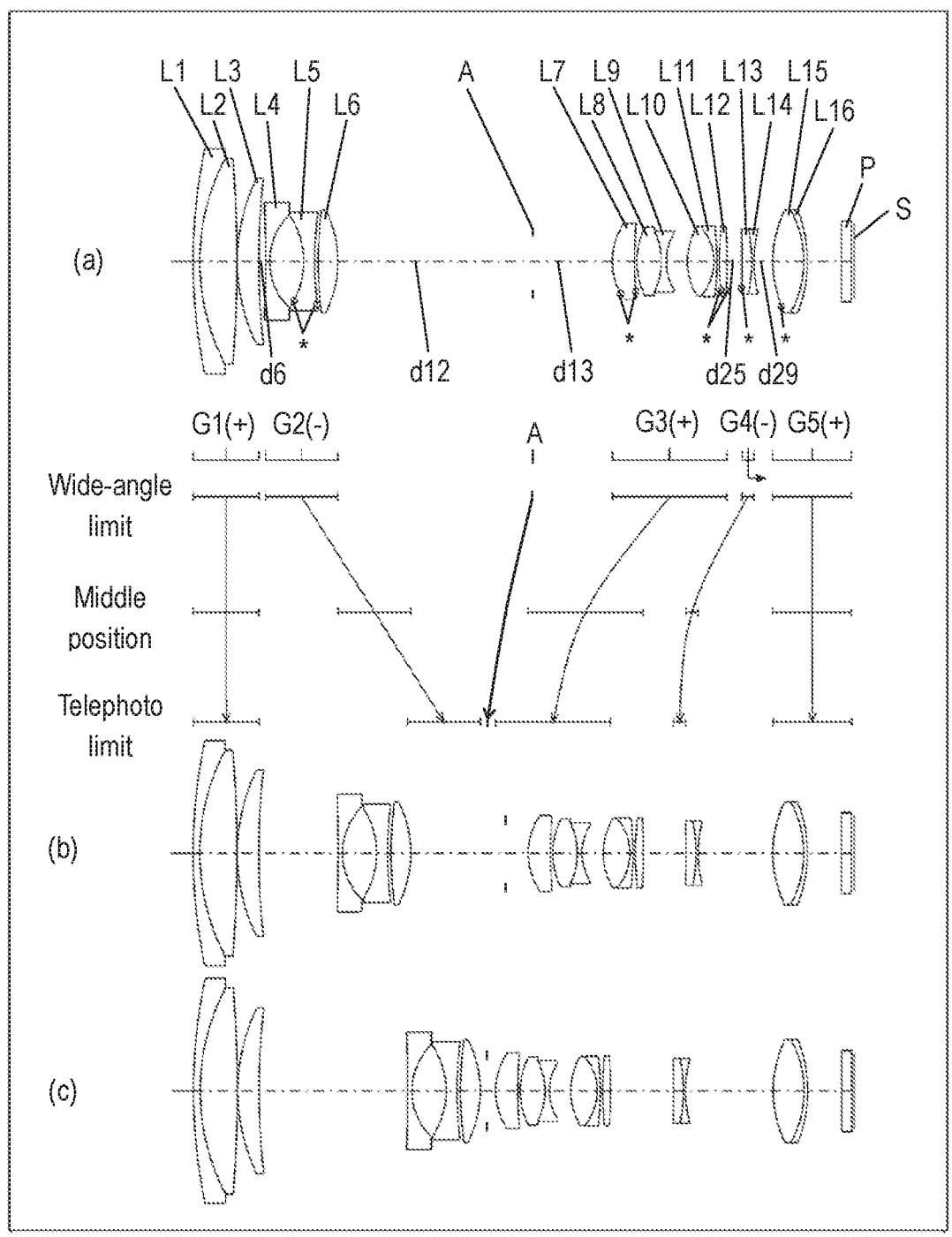
FIG. 5 illustrates lens layout diagrams in an infinity focus state of a zoom lens system according to a third exemplary embodiment (Numerical Example 3)
Figure 6:
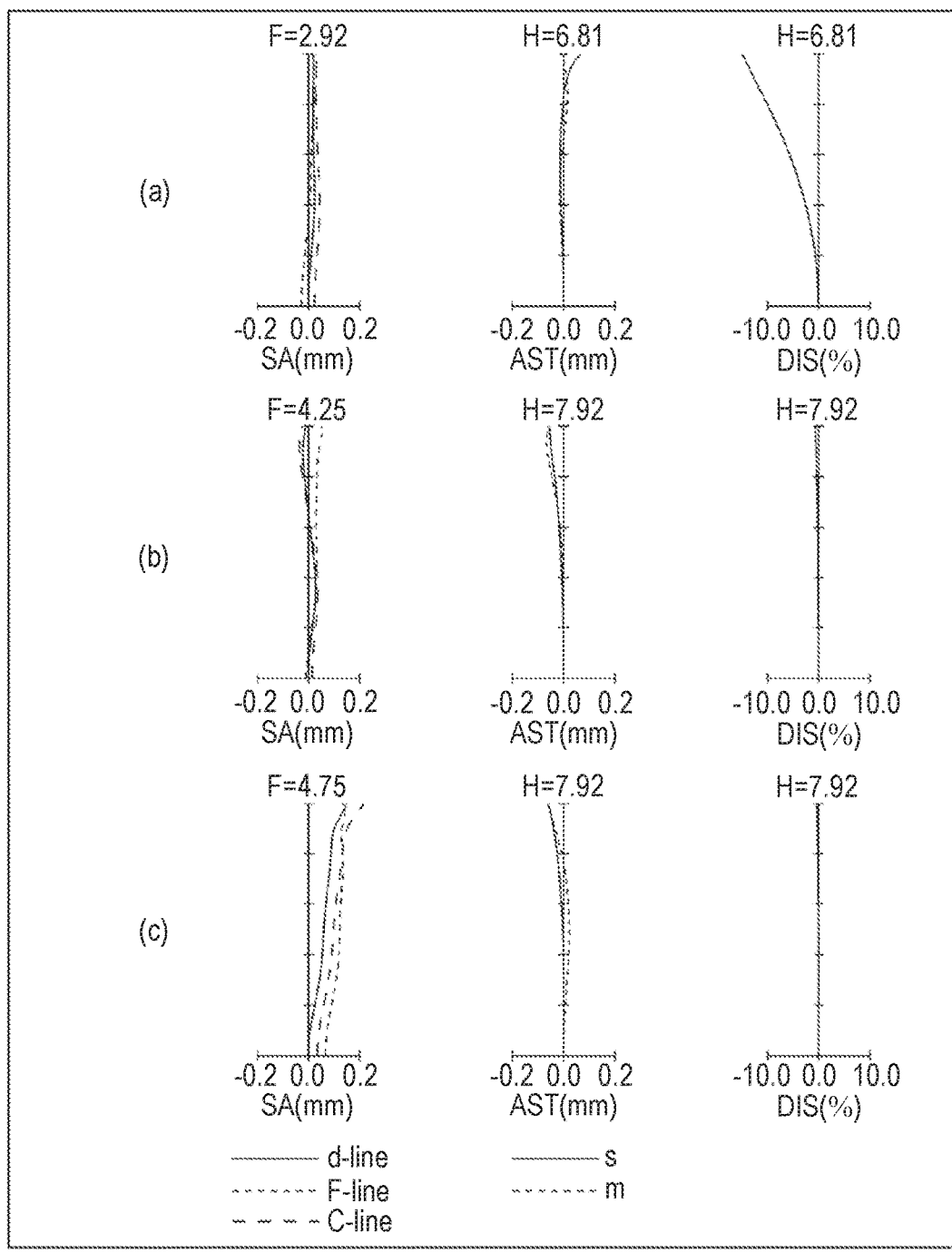
FIG. 6 illustrates longitudinal aberration diagrams in the infinity focus state of the zoom lens system according to the third exemplary embodiment.

FIG. 5 illustrates a zoom lens system according to a third exemplary embodiment.

The zoom lens system is configured by, in order from an object side to an image side, first lens group G1 having a positive power, second lens group G2 having a negative power, aperture stop A, third lens group G3 having a positive power, fourth lens group G4 having a negative power, fifth lens group G5 having a positive power, and planar parallel plate P. Fifth lens group G5 constitutes a succeeding lens group.

First lens group G1 is configured by, in order from the object side to the image side, first lens element L1 having a negative power, second lens element L2 having a positive power, and third lens element L3 having a positive power. First lens element L1 and second lens element L2 are bonded by, for example, an adhesive to constitute a cemented doublet lens.

Second lens group G2 is configured by, in order from the object side to the image side, fourth lens element L4 having a negative power, fifth lens element L5 having a negative power, and sixth lens element L6 having a positive power.

Third lens group G3 is configured by, in order from the object side to the image side, seventh lens element L7 having a positive power, eighth lens element L8 having a positive power, ninth lens element L9 having a negative power, tenth lens element L10 having a positive power, eleventh lens element L11 having a negative power, and twelfth lens element L12 having a positive power. Eighth lens element L8 and ninth lens element L9 are bonded by, for example, an adhesive to constitute a cemented doublet lens. Tenth lens element L10 and eleventh lens element L11 are bonded by, for example, an adhesive to constitute a cemented doublet lens.

Fourth lens group G4 is configured by, in order from the object side to the image side, thirteenth lens element L13 having a positive power, and fourteenth lens element L14 having a negative power. Thirteenth lens element L13 and fourteenth lens element L14 are bonded by, for example, an adhesive to constitute a cemented doublet lens.

Fifth lens group G5 is configured by, in order from the object side to the image side, fifteenth lens element L15 having a positive power, and sixteenth lens element L16 having a negative power. Fifteenth lens element L15 and sixteenth lens element L16 are bonded by, for example, an adhesive to constitute a cemented doublet lens.

Aperture stop A is located between six lens element L6 and seventh lens element L7.

Each of the lens elements will now be described.

The lens elements in first lens group G1 will be described. First lens element L1 is a meniscus lens having a convex surface facing the object side. Second lens element L2 is a double-convex lens. Third lens element L3 is a meniscus lens having a convex surface facing the object side.

The lens elements in second lens group G2 will be described. Fourth lens element L4 is a double-concave lens. Fifth lens element L5 is a double-concave lens having opposite concave surfaces each of which is an aspherical surface. Sixth lens element L6 is a double-convex lens.

The lens elements in third lens group G3 will be described. Seventh lens element L7 is a meniscus lens having a convex surface facing the object side, and has aspherical surfaces on both of its opposite surfaces. Eighth lens element L8 is a double-convex lens. Ninth lens element L9 is a double-concave lens. Tenth lens element L10 is a double-convex lens. Eleventh lens L11 is a meniscus lens having a concave surface facing the object side. Twelfth lens element L12 is a meniscus lens having a convex surface facing the object side, and has aspherical surfaces on both of its opposite surfaces.

The lens element in fourth lens group G4 will be described. Thirteenth lens element L13 is a meniscus lens having a concave surface facing the object side which is an aspherical surface. Fourteenth lens element L14 is a double-concave lens.

The lens element in fifth lens group G5 will be described. Fifteenth lens element L15 is a double-convex lens having an aspherical surface facing the object side. Sixteenth lens element L16 is a meniscus lens having a concave surface facing the object side.

In the zoom lens system, during zooming from a wide-angle limit to a telephoto limit in image shooting, first lens group G1 does not move, second lens group G2 moves toward the image surface side, aperture stop A moves toward the object side, third lens group G3 moves toward the object side, fourth lens group G4 moves toward the object side, and fifth lens group G5 does not move. That is, during zooming, the lens groups move along an optical axis in such a manner that a distance between first lens group G1 and second lens group G2 increases, a distance between second lens group G2 and aperture stop A decreases, a distance between aperture stop A and third lens group G3 decreases, a distance between third lens group G3 and fourth lens group G4 increases, and a distance between fourth lens group G4 and fifth lens group G5 increases. Also, as shown in FIG. 5, during zooming from the wide-angle limit to the telephoto limit, the aperture diameter of aperture stop A increases.

In the zoom lens system, during focusing from the infinity focus state to the proximity focus state, fourth lens group G4 moves toward the image side along the optical axis as indicated by the arrow below G4 in FIG. 5.

Fourth Exemplary Embodiment

Figure 7:
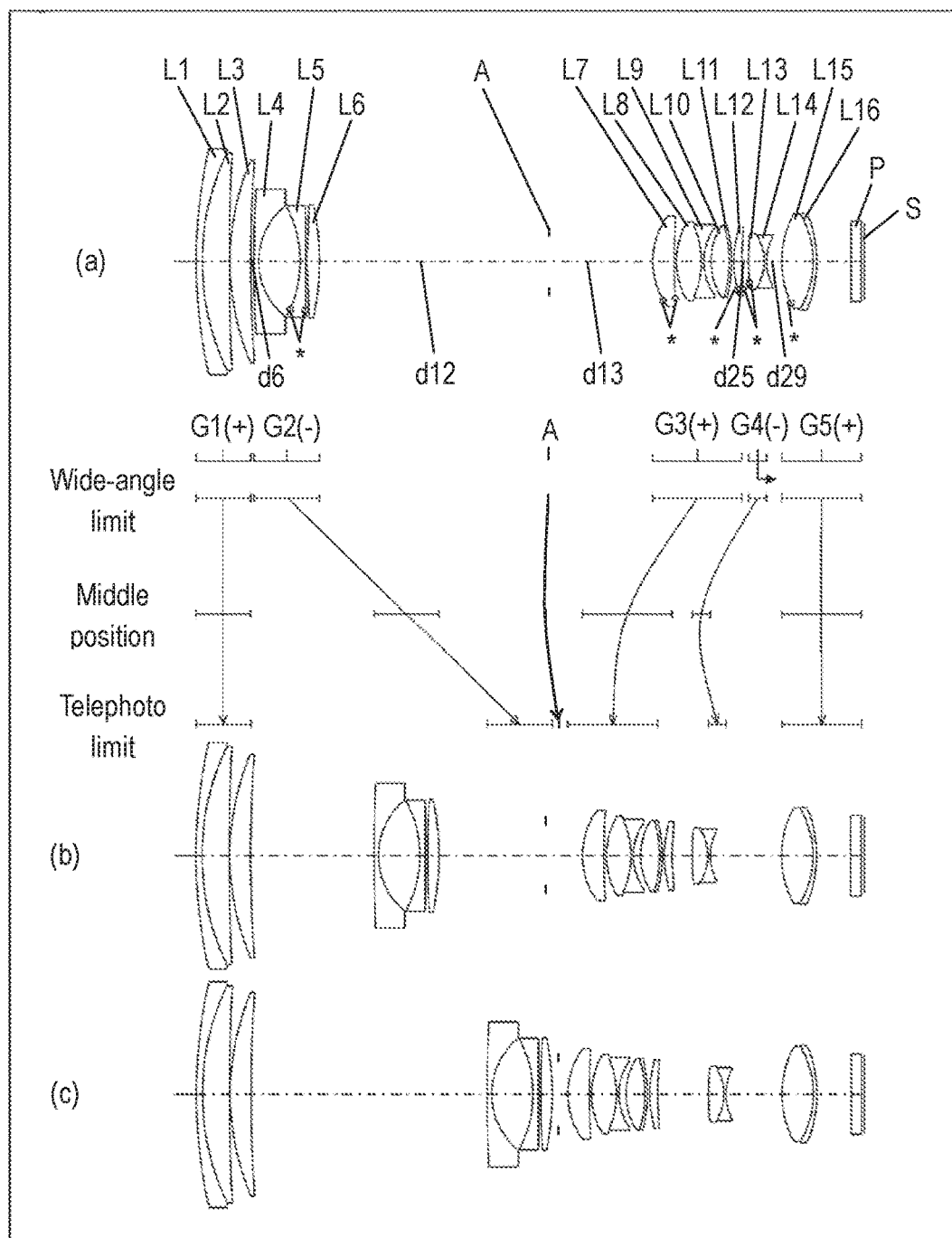
FIG. 7 illustrates lens layout diagrams in an infinity focus state of a zoom lens system according to a fourth exemplary embodiment (Numerical Example 4)
Figure 8:
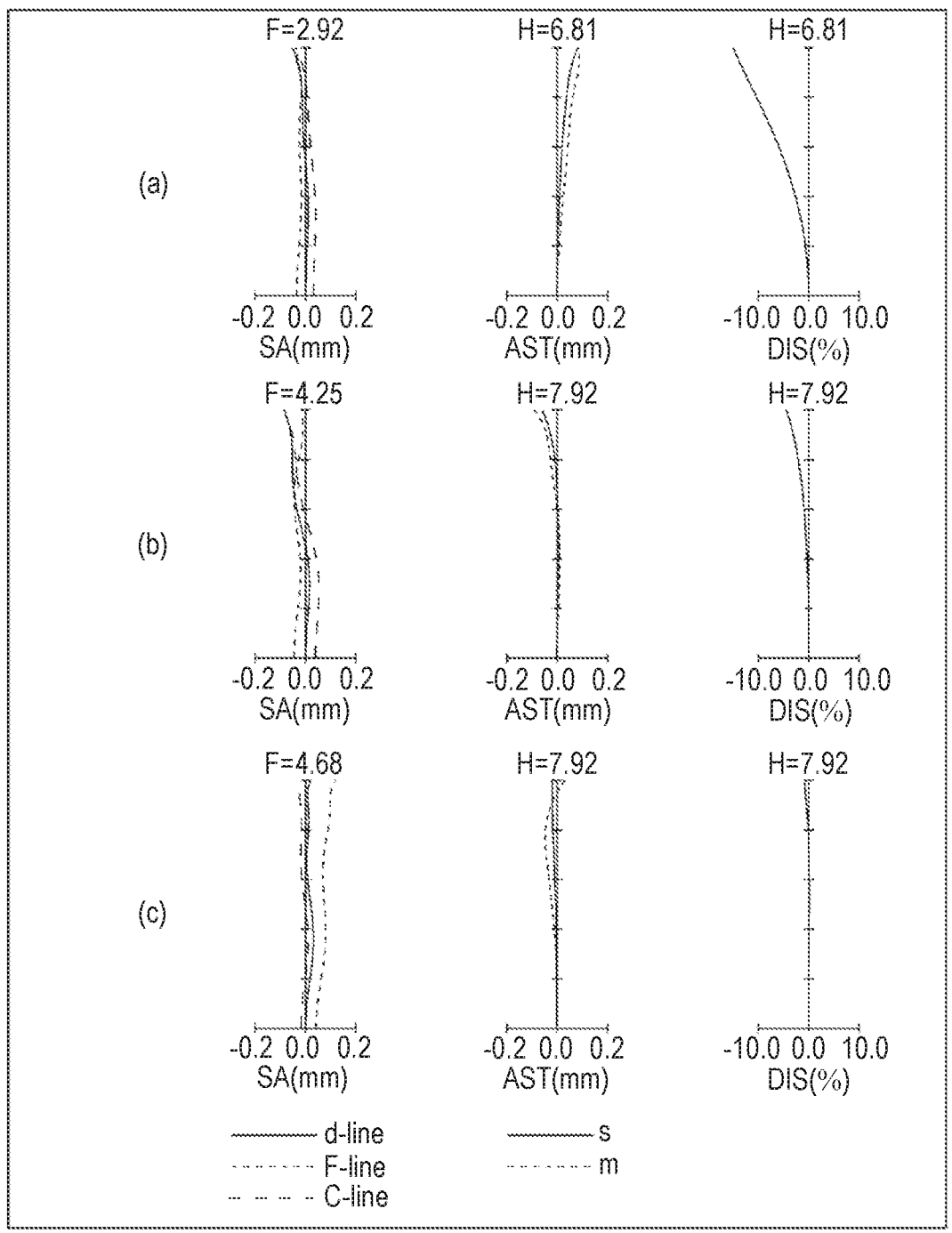
FIG. 8 illustrates longitudinal aberration diagrams in the infinity focus state of the zoom lens system according to the fourth exemplary embodiment.

FIG. 7 illustrates a zoom lens system according to a fourth exemplary embodiment.

The zoom lens system is configured by, in order from an object side to an image side, first lens group G1 having a positive power, second lens group G2 having a negative power, aperture stop A, third lens group G3 having a positive power, fourth lens group G4 having a negative power, fifth lens group G5 having a positive power, and planar parallel plate P. Fifth lens group G5 constitutes a succeeding lens group.

First lens group G1 is configured by, in order from the object side to the image side, first lens element L1 having a negative power, second lens element L2 having a positive power, and third lens element L3 having a positive power. First lens element L1 and second lens element L2 are bonded by, for example, an adhesive to constitute a cemented doublet lens.

Second lens group G2 is configured by, in order from the object side to the image side, fourth lens element L4 having a negative power, fifth lens element L5 having a negative power, and sixth lens element L6 having a positive power.

Third lens group G3 is configured by, in order from the object side to the image side, seventh lens element L7 having a positive power, eighth lens element L8 having a positive power, ninth lens element L9 having a negative power, tenth lens element L10 having a positive power, eleventh lens element L11 having a negative power, and twelfth lens element L12 having a positive power. Eighth lens element L8 and ninth lens element L9 are bonded by, for example, an adhesive to constitute a cemented doublet lens. Tenth lens element L10 and eleventh lens element L11 are bonded by, for example, an adhesive to constitute a cemented doublet lens.

Fourth lens group G4 is configured by, in order from the object side to the image side, thirteenth lens element L13 having a positive power, and fourteenth lens element L14 having a negative power. Thirteenth lens element L13 and fourteenth lens element L14 are bonded by, for example, an adhesive to constitute a cemented doublet lens.

Fifth lens group G5 is configured by, in order from the object side to the image side, fifteenth lens element L15 having a positive power, and sixteenth lens element L16 having a negative power. Fifteenth lens element L15 and sixteenth lens element L16 are bonded by, for example, an adhesive to constitute a cemented doublet lens.

Aperture stop A is located between six lens element L6 and seventh lens element L7.

Each of the lens elements will now be described.

The lens elements in first lens group G1 will be described. First lens element L1 is a meniscus lens having a convex surface facing the object side. Second lens element L2 is a meniscus lens having a convex surface facing the object side. Third lens element L3 is a meniscus lens having a convex surface facing the object side.

The lens elements in second lens group G2 will be described. Fourth lens element L4 is a meniscus lens having a convex surface facing the object side. Fifth lens element L5 is a double-concave lens having opposite concave surfaces each of which is an aspherical surface. Sixth lens element L6 is a double-convex lens.

The lens elements in third lens group G3 will be described. Seventh lens element L7 is a meniscus lens having a convex surface facing the object side, and has aspherical surfaces on both of its opposite surfaces. Eighth lens element L8 is a double-convex lens. Ninth lens element L9 is a double-concave lens. Tenth lens element L10 is a double-convex lens. Eleventh lens L11 is a meniscus lens having a concave surface facing the object side. Twelfth lens element L12 is a meniscus lens having a convex surface facing the object side, and has aspherical surfaces on both of its opposite surfaces.

The lens element in fourth lens group G4 will be described. Thirteenth lens element L13 is a double-convex lens having an aspherical surface facing the object side. Fourteenth lens element L14 is a double-concave lens.

The lens element in fifth lens group G5 will be described. Fifteenth lens element L15 is a double-convex lens having an aspherical surface facing the object side. Sixteenth lens element L16 is a meniscus lens having a concave surface facing the object side.

In the zoom lens system, during zooming from a wide-angle limit to a telephoto limit in image shooting, first lens group G1 does not move, second lens group G2 moves toward the image surface side, aperture stop A moves to form a locus that is convex toward the object side, third lens group G3 moves toward the object side, fourth lens group G4 moves to form a locus that is convex toward the object side, and fifth lens group G5 does not move. That is, during zooming, the lens groups move along an optical axis in such a manner that a distance between first lens group G1 and second lens group G2 increases, a distance between second lens group G2 and aperture stop A decreases, a distance between aperture stop A and third lens group L3 decreases, a distance between third lens group G3 and fourth lens group G4 increases, and a distance between fourth lens group G4 and fifth lens group G5 increases in the range from the wide-angle limit to the middle position, and decreases in the range from the middle position to the telephoto limit. Also, as shown in FIG. 7, during zooming from the wide-angle limit to the telephoto limit, the aperture diameter of aperture stop A increases.

In the zoom lens system, during focusing from the infinity focus state to the proximity focus state, fourth lens group G4 moves toward the image side along the optical axis as indicated by the arrow below G4 in FIG. 7.

Other Exemplary Embodiments

In the above description, first through fourth exemplary embodiments have been described as examples of techniques disclosed in the present application. However, the techniques according to the present disclosure are not limited to the above-described exemplary embodiments, and may be applied to other exemplary embodiments in which modifications, substitutions, additions, and/or omissions are made.

Conditions, Advantageous Effects, Etc

Hereinafter, conditions that can be satisfied by the zoom lens systems according to the first through fourth exemplary embodiments will be described. A plurality of possible conditions will be defined with respect to the zoom lens systems according to the first through fourth exemplary embodiments. A zoom lens system that satisfies all those possible conditions may be most effective. However, it may also be possible to obtain a zoom lens system that satisfies an individual condition of the possible conditions and provides an advantageous effect corresponding to the individual condition.

Each zoom lens system comprises, in order from an object side to an image side, first lens group G1 having a positive power, second lens group G2 having a negative power, aperture stop A, third lens group G3 having a positive power, and fourth lens group G4 having a negative power. During zooming, a total length of the zoom lens system does not change, and aperture stop A moves along an optical axis independently of second lens group G2 and third lens group G3.

The zoom lens system may desirably satisfy, for example, the following conditions (1) and (2):

$$6.0 < f1/fw < 20.0 \tag{1}$$

$$0.5 < |f4|/fw < 4.0 \tag{2}$$

where f1 is a focal length of first lens group G1,
f4 is a focal length of fourth lens group G4, and
fw is a focal length of the zoom lens system at a wide-angle limit.

Specific numerical values of the focal lengths of first lens group G1 and fourth lens group G4 will be indicated in zoom lens group data shown in Table 3C, Table 6C, Table 9C and Table 12C in later described Numerical Examples 1 through 4. Specific numerical values of the focal length of the entire zoom lens system at the wide-angle limit will be indicated in various data shown in Table 3A, Table 6A, Table 9A and Table 12A in later described Numerical Examples 1 and 2.

Condition (1) defines a ratio of the focal length of first lens group G1 and the focal length of the entire zoom lens system at the wide-angle limit. If the upper limit of condition (1) is exceeded, the focal length of first lens group G1 becomes excessively long, so that the distance between first lens group G1 and second lens group G2 at the telephoto limit becomes excessively large. If the lower limit of condition (1) is exceeded, it becomes difficult to correct the axial chromatic aberration and the field curvature at the telephoto limit. Accordingly, if condition (1) is not satisfied, it is difficult to provide a small-size, high-performance zoom lens system.

Condition (2) defines a ratio of the focal length of fourth lens group G4 and the focal length of the entire zoom lens system at the wide-angle limit. If the upper limit of condition (2) is exceeded, the moving distance of the focus lens becomes large, so that the size of the optical system becomes large. If the lower limit of condition (2) is exceeded, the field curvature becomes large in the proximity focus state.

Preferably, either one of condition (1a), condition (1b), condition (2a) and condition (2b) shown below may be satisfied to enhance the above-described advantageous effects.

$$f1/fw > 6.25 \tag{1a}$$

$$f1/fw < 16.0 \tag{1b}$$

$$|f4|/fw > 0.75 \tag{2a}$$

$$|f4|/fw < 3.50 \tag{2b}$$

More preferably, either one of condition (1c), condition (1d), condition (2c) and condition (2d) shown below may be satisfied to further enhance the above-described advantageous effects.

$$f1/fw>6.5 \quad (1c)$$

$$f1/fw<12.0 \quad (1d)$$

$$|f4|/fw>1.0 \quad (2c)$$

$$|f4|/fw<3.0 \quad (2d)$$

Further, for example, in the zoom lens system, it is desirable that aperture stop A moves, during zooming, along the optical axis independently of second lens group G2 and third lens group G3, and satisfies the following condition (3):

$$D13w/(D12w+D13w)>0.15 \quad (3)$$

where

D12w is a distance between second lens group G2 and aperture stop A at the wide-angle limit, and D13w is a distance between aperture stop A and third lens group G3 at the wide-angle limit.

Specific numerical values of the distance between second lens group G2 and aperture stop A at the wide-angle limit and the distance between aperture stop A and third lens group G3 at the wide-angle limit will be indicated in various data shown in Table 3A, Table 6A, Table 9A and Table 12A in later described Numerical Examples 1 through 4.

Condition (3) defines the distance between aperture stop A and third lens group G3 relative to the distance between second lens group G2 and third lens group G3. If the lower limit of condition (3) is exceeded, it becomes difficult to suppress the aberration of the intermediate image height at the wide-angle limit.

Preferably, in addition to condition (3), it is desirable to satisfy the following condition (3a).

$$D13w/(D12w+D13w)<0.50 \quad (3a)$$

If the upper limit of condition (3a) is exceeded, it is necessary to increase the lens diameter of each lens of the third lens group G3 and the subsequent lens groups to ensure the peripheral illumination, so that the size of the optical system becomes large.

More preferably, condition (3b) shown below may be satisfied to enhance the above-described advantageous effects.

$$D13w/(D12w+D13w)>0.20 \quad (3b)$$

Still more preferably, either one of condition (3c) and condition (3d) shown below may be satisfied to further enhance the above-described advantageous effects.

$$D13w/(D12w+D13w)>0.25 \quad (3c)$$

$$D13w/(D12w+D13w)<0.45 \quad (3d)$$

Further, for example, it is desirable that the zoom lens system satisfies the following condition (4):

$$T21t/T21w<1.0 \quad (4)$$

where

T21t is a distance between second lens group G2 and image surface S at the telephoto limit, and T21w is a distance between second lens group G2 and image surface S at the wide-angle limit.

Specific numerical values of the distance between second lens group G2 and image surface S at the telephoto limit and the distance between second lens group G2 and image surface S at the wide-angle limit can be calculated from various data shown in Table 3A, Table 6A, Table 9A and Table 12A in later described Numerical Examples 1 through 4.

Condition (4) defines the moving amount of second lens group G2 from the wide-angle limit to the telephoto limit. If the upper limit of condition (4) is exceeded, the moving amount of second lens group G2 becomes excessively large, so that the size of the optical system becomes large.

Preferably, in addition to condition (4), it is desirable to satisfy the following condition (4a).

$$T21t/T21w>0.3 \quad (4a)$$

If the lower limit of condition (4a) is exceeded, zooming performance reduces, so that it becomes difficult to obtain a large zoom ratio.

More preferably, condition (4b) shown below may be satisfied to enhance the above-described advantageous effects.

$$T21t/T21w<0.9 \quad (4b)$$

Still more preferably, either one of condition (4c) and condition (4d) shown below may be satisfied to further enhance the above-described advantageous effects.

$$T21t/T21w>0.4 \quad (4c)$$

$$T21t/T21w<0.8 \quad (4d)$$

Further, for example, in the zoom lens system, it is desirable that at least one lens element included in the lens groups that are disposed between aperture stop A and the image end (image surface S) moves along the optical axis during focusing. This makes it possible to reduce the lens diameters of the focus lens groups, so that it becomes easy to reduce the weight of the optical system.

Further, for example, it is desirable that the zoom lens system is configured such that a lens group which is closest to the image surface end (image surface S) does not move relative to image surface S (is fixed relative to the image surface) during zooming. This makes it possible to simplify the mechanism, so that the lens barrel can be small-sized.

Further, for example, it is desirable, in the zoom lens system, that first lens group G1 comprises, in order from the object side to the image side, first lens element L1 having s negative power, second lens element L2 having a positive power, and third lens element L3 having a positive power, and satisfies the following condition (5):

$$dPgF2>0.005 \quad (5)$$

where dPgF2 is an anomalous dispersion of g-line and F-line of second lens element L2.

Condition (5) defines the anomalous dispersion of second lens element L2. It becomes easy by satisfying condition (5) to correct the secondary spectrum of the chromatic aberration. If the lower limit of condition (5) is exceeded, on the contrary, it becomes difficult to correct the secondary spectrum, so that it becomes difficult to achieve a high-performance lens system that produces less chromatic aberration from the infinity focus state to the proximity focus state.

Preferably, it is desirable to satisfy the following condition (5a):

$$dPgF2>0.009 \quad (5a)$$

More preferably, condition (5b) shown below may be satisfied to enhance the above-described advantageous effects.

$$dPgF2>0.015 \quad (5b)$$

Further, for example, it is desirable that the zoom lens system satisfies both the above condition (5) and the following condition (6) simultaneously.

$$dPgF3>0.005 \quad (6)$$

where dPgF3 is an anomalous dispersion of g-line and F-line of third lens element L3.

Condition (6) defines the anomalous dispersion of third lens element L3. It becomes easier by satisfying condition (6) to correct the secondary spectrum of the chromatic aberration. If the lower limit of condition (6) is exceeded, on the contrary, it becomes difficult to correct the secondary spectrum, so that it becomes difficult to achieve a high-performance lens system that produces less chromatic aberration from the infinity focus state to the proximity focus state.

Preferably, it is desirable to satisfy the following condition (6a):

$$dPgF3 > 0.009 \quad (6a)$$

More preferably, condition (6b) shown below may be satisfied to enhance the above-described advantageous effects.

$$dPgF3 > 0.015 \quad (6b)$$

Figure 9:
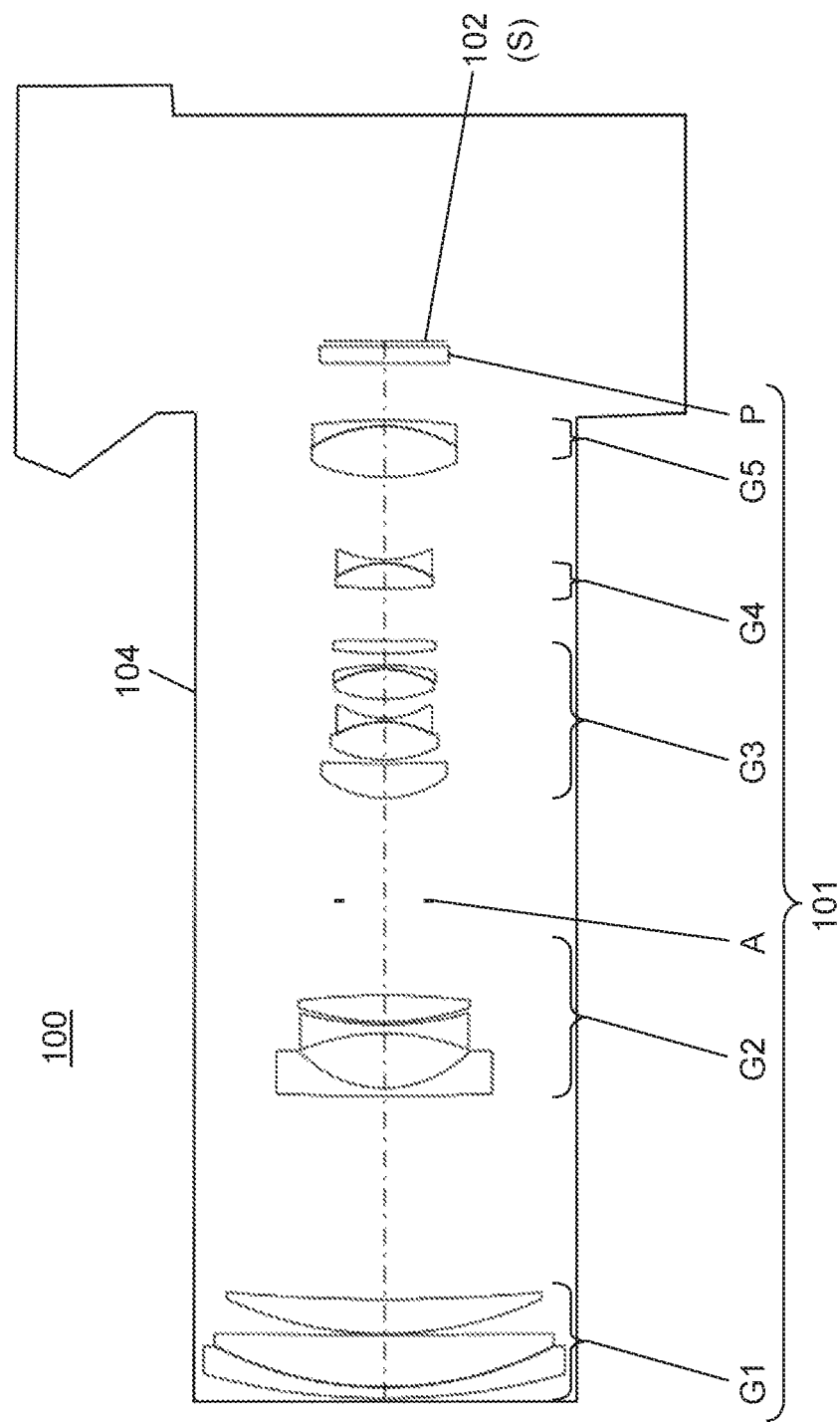
FIG. 9 is a schematic configuration diagram of an imaging apparatus using the zoom lens system according to the first exemplary embodiment.

Schematic Configuration of an Imaging Apparatus Using the First Exemplary Embodiment FIG. 9 illustrates a schematic configuration of an imaging apparatus using the zoom lens system according to the first exemplary embodiment. It should be noted that the zoom lens systems according to the second, third and fourth exemplary embodiments may also be applied to the imaging apparatus.

Imaging apparatus 100 is configured by body 104, image sensor 102, and zoom lens system 101. A specific example of imaging device 100 may be a digital camera.

Zoom lens system 101 comprises first lens group G1, second lens group G2, aperture stop A, third lens group G3, fourth lens group G4, fifth lens group G5.

Image sensor 102 is disposed at the position of image surface S in the zoom lens system according to the first exemplary embodiment.

Zoom lens system 101 further includes, in body 104, actuators and lens frames to allow second lens group G2, aperture stop A, third lens group G3 and fourth lens group G4 to move during zooming.

With this configuration, it is possible to realize a small-size, high-performance imaging apparatus.

Figure 10:
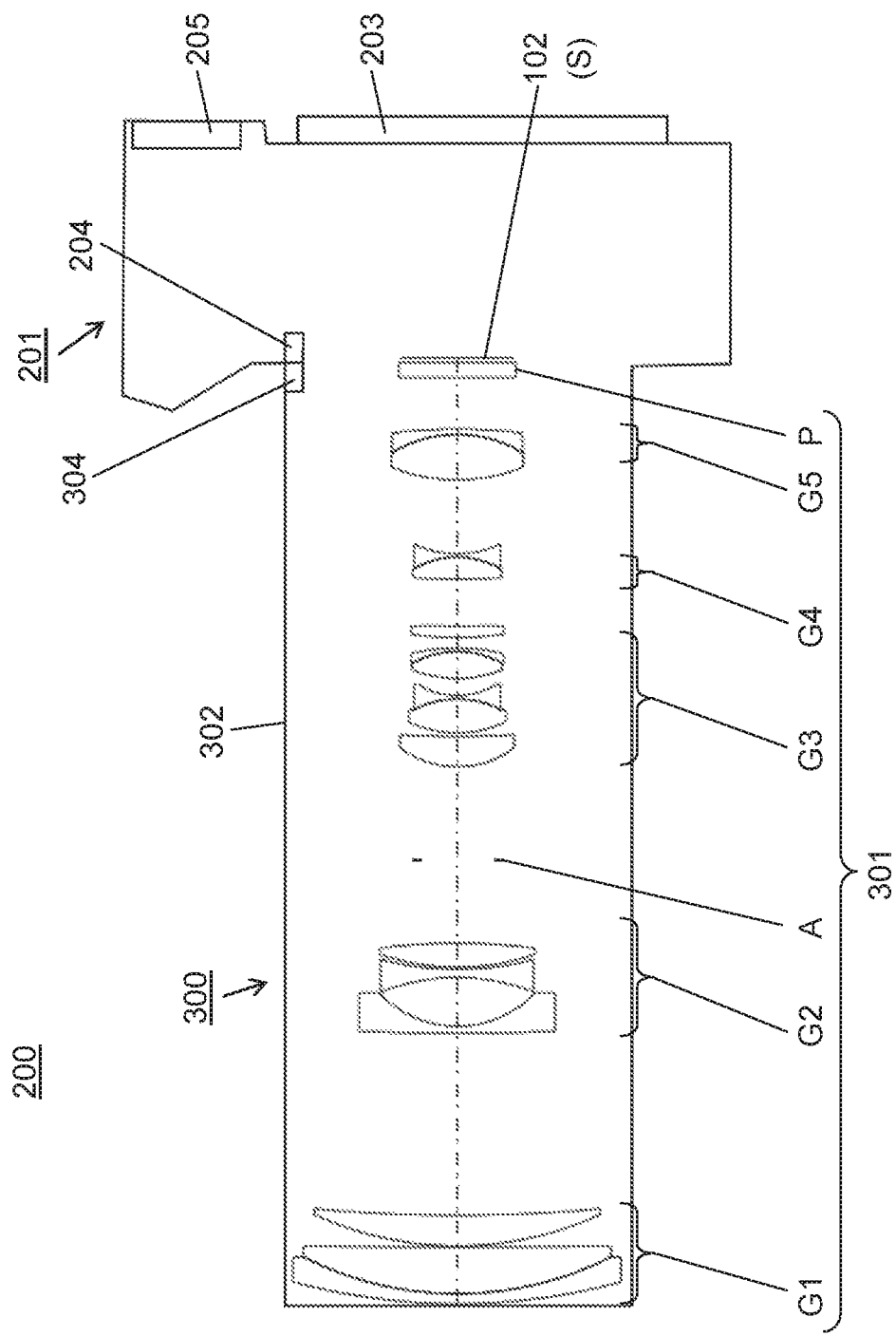
FIG. 10 is a schematic configuration diagram of a camera using the zoom lens system according to the first exemplary embodiment

Although an example of applying the zoom lens system according to the first exemplary embodiment to a digital camera has been described in the above, the zoom lens system may also be applied to a smartphone and the like.
Schematic Configuration of a Camera Using the First Exemplary Embodiment FIG. 10 illustrates a schematic configuration of a camera using the zoom lens system according to the first exemplary embodiment. It should be noted that the zoom lens systems according to the second, third and fourth exemplary embodiments may also be applied to the camera.

Camera 200 comprises camera body 201, and exchangeable lens device 300 detachably connected to camera body 201.

Camera body 201 includes image sensor 202 that receives an optical image formed by the zoom lens system of exchangeable lens device 300 and converts the received optical image to an electrical image signal, monitor 203 that displays the image signal converted by image sensor 202, a memory (not shown in the figure) that stores the image signal, camera mount unit 204, and finder 205.

Exchangeable lens device 300 includes first lens group G1, second lens group G2, aperture stop A, third lens group G3, fourth lens group G4, fifth lens group G5, lens barrel 302 that holds these lens groups and aperture stop, and lens mount unit 304 that is connected to camera mount unit 204 of camera body 201.

Camera mount unit 204 and lens mount unit 304 physically connect camera body 201 and exchangeable lens device 300, and also electrically connect a controller (not shown in the figure) provided in camera body 201 and a controller (not shown in the figure) provided in exchangeable lens device 300 to function as an interface for mutual signal communications between these controllers.

Zoom lens system 301 comprises the lens groups held by lens barrel 302, and planar parallel plate P of camera body 201. Zoom lens system 301 further includes actuators and lens frames which are controlled by the controller in exchangeable lens device 300 to allow second lens group G2, aperture stop A, third lens group G3 and fourth lens group G4 to move during zooming.

With this configuration, it is possible to realize a small-size, high-performance camera.

It would be obvious that the lens barrel may be configured to be able to also hold six lens group G6 in a case of using the zoom lens system according to the second exemplary embodiment.

NUMERICAL EXAMPLES

Hereinafter, Numerical Examples will be described as specific examples in which the zoom lens systems according to the first through fourth exemplary embodiments are implemented. In each of the Numerical Examples, all the lengths in each Table are indicated in unit of "mm", and all the angles of view in each Table are indicated in unit of "°" (degrees). In each of the Numerical Examples, r is a radius of curvature, d is a distance between adjacent surfaces, nd is a refractive index for the d-line, and vd is an Abbe's number with respect to the d-line, and dPgF is an anomalous dispersion of g-line and F-line. In each of the Numerical Examples, a surface provided with * (asterisk) is an aspherical surface, which is defined by the following equation:

$$Z = \frac{h^2/r}{1+\sqrt{1-(1+\kappa)(h/r)^2}} + \sum A_n h^n$$

where

Z is a distance from a point on an aspherical surface at a height of h from the optical axis to a tangent plane of a vertex of the aspherical surface, h is a height from the optical axis, r is a vertex radius of curvature, κ is a conic constant, and An is an n-th order aspheric coefficient.

In each of the Numerical Examples, the aperture diameter is an effective aperture diameter of the aperture stop at each zoom position.

FIGS. 2, 4, 6 and 8 illustrate longitudinal aberration diagrams in the infinity focus state of the zoom lens systems according to Examples 1, 2, 3 and 4, respectively.

In each of FIGS. 2, 4, 6 and 8, (a) illustrates aberrations at a wide-angle limit, (b) illustrates aberrations at a middle position, and (c) illustrates aberrations at a telephoto limit. In each of (a), (b) and (c), a spherical aberration (SA (mm)), an astigmatism (AST (mm)), and a distortion (DIS (%)) are illustrated in order from the left. In each spherical aberration diagram, the ordinate denotes an F number (indicated by F in the diagram), a solid-line represents a characteristic of the d-line, a short-dashed line represents a characteristic for F-line, and a long-dashed line represents a characteristic of a C-line. In each astigmatism diagram, the ordinate denotes an image height (indicated by H in the diagram), a solid line represents a characteristic of a sagittal plane (indicated by s in each figure), and a broken line represents a characteristic of a meridional plane (indicated by m in each figure). In each distortion diagram, the ordinate denotes an image height (indicated by H in the diagram).

Numerical Example 1

The zoom lens system in Numerical Example 1 corresponds to that of the first exemplary embodiment illustrated in FIG. 1. With respect to the zoom lens system in Numerical Example 1, surface data are shown in Table 1, aspherical surface data are shown in Table 2, and various data in an infinity focus state are shown in Tables 3A through 3D.

TABLE 1

Surface Data
Unit: mm

| Surface number | r | d | nd | vd | dPgF |
|---|---|---|---|---|---|
| Object surface | ∞ | | | | |
| 1 | 91.82400 | 1.50000 | 1.90366 | 31.3 | 0.0028 |
| 2 | 49.86550 | 0.00500 | 1.56732 | 42.8 | |
| 3 | 49.86550 | 7.05000 | 1.59282 | 68.6 | 0.0194 |
| 4 | 3000.00000 | 0.15000 | | | |
| 5 | 50.36770 | 4.62000 | 1.59282 | 68.6 | 0.0194 |
| 6 | 240.88000 | Variable | | | |
| 7 | 386.97690 | 1.04760 | 1.95375 | 32.3 | 0.0000 |
| 8 | 15.78080 | 7.36000 | | | |
| 9* | −27.10600 | 1.20000 | 1.80525 | 40.9 | −0.0066 |
| 10 | 51.68370 | 0.33000 | | | |
| 11 | 35.33660 | 3.59000 | 1.94595 | 18.0 | 0.0386 |
| 12 | −91.26890 | Variable | | | |
| 13 | ∞ | Variable | | | |
| (Aperture) | | | | | |
| 14 | 14.09400 | 4.60000 | 1.77182 | 49.6 | −0.0070 |
| 15 | 174.51510 | 0.50000 | | | |
| 16 | 16.34230 | 5.12000 | 1.49700 | 81.6 | 0.0375 |
| 17 | −13.48100 | 0.00500 | 1.56732 | 42.8 | |
| 18 | −13.48100 | 0.50000 | 1.88300 | 40.8 | −0.0094 |
| 19 | 11.14410 | 2.57000 | | | |
| 20 | 18.14670 | 4.06000 | 1.55024 | 75.6 | 0.0194 |
| 21 | −13.12200 | 0.00500 | 1.56732 | 42.8 | |
| 22 | −13.12200 | 0.50000 | 1.69895 | 30.0 | 0.0086 |
| 23 | −30.17560 | 1.54000 | | | |
| 24* | 34.16150 | 1.76000 | 1.68820 | 31.1 | 0.0074 |
| 25* | 149.69900 | Variable | | | |
| 26* | 104.06480 | 3.33000 | 1.68820 | 31.1 | 0.0074 |
| 27 | −12.53120 | 0.00500 | 1.56732 | 42.8 | |
| 28 | −12.53120 | 0.50000 | 1.80420 | 46.5 | −0.0066 |
| 29 | 14.91470 | Variable | | | |
| 30* | 27.16790 | 6.85000 | 1.80525 | 40.9 | −0.0066 |
| 31 | −18.30770 | 0.00500 | 1.56732 | 42.8 | |
| 32 | −18.30770 | 0.80000 | 1.92119 | 24.0 | 0.0151 |
| 33 | −81.70770 | 7.67000 | | | |
| 34 | ∞ | 2.30000 | 1.51680 | 64.2 | 0.0016 |
| 35 | ∞ | BF | | | |
| Image surface | ∞ | | | | |

TABLE 2

Aspherical Surface Data

Surface No. 9

K = 3.51523E+00, A4 = 9.50609E−05, A6 = −1.19316E−06, A8 = 1.02224E−08, A10 = −2.26985E−11, A12 = 0.00000E+00

TABLE 2-continued

Aspherical Surface Data

Surface No. 10

K = 0.00000E+00, A4 = 6.80001E−05, A6 = −1.23885E−06, A8 = 1.06516E−08, A10 = −3.20770E−11, A12 = 0.00000E+00

Surface No. 14

K = 8.36518E−01, A4 = −4.21007E−05, A6 = 7.09284E−08, A8 = −6.19453E−09, A10 = 5.96586E−11, A12 = −4.68713E−13

Surface No. 15

K = 0.00000E+00, A4 = −1.45079E−05, A6 = 3.76423E−07, A8 = −4.65945E−09, A10 = 4.02785E−11, A12 = 0.00000E+00

Surface No. 24

K = 0.00000E+00, A4 = −8.67409E−05, A6 = −6.80320E−07, A8 = 2.20681E−08, A10 = −4.09626E−10, A12 = 0.00000E+00

Surface No. 25

K = 0.00000E+00, A4 = −6.76312E−05, A6 = −8.32658E−07, A8 = 2.65808E−08, A10 = −4.37836E−10, A12 = 0.00000E+00

Surface No. 26

K = 0.00000E+00, A4 = 2.07523E−05, A6 = −3.49617E−07, A8 = 1.56939E−08, A10 = −1.68224E−10, A12 = 0.00000E+00

Surface No. 30

K = 0.00000E+00, A4 = 1.07094E−05, A6 = 1.16689E−07, A8 = −7.07962E−10, A10 = 2.28709E−12, A12 = 0.00000E+00

Various Data in an Infinity Focus State

TABLE 3A

Various Data
Zoom Ratio: 18.45502

| | Wide-angle limit | Middle position | Telephoto limit |
|---|---|---|---|
| Focal length | 9.1401 | 39.1047 | 168.6806 |
| F-number | 2.91353 | 4.32290 | 4.63206 |
| Angel of view | 41.1636 | 11.5081 | 2.7031 |
| Image height | 6.8100 | 7.9180 | 7.9180 |
| Total length of the zoom lens system | 142.2000 | 142.2000 | 142.2000 |
| BF | 0.71405 | 0.67946 | 0.66746 |
| d6 | 0.8772 | 27.3614 | 51.9806 |
| d12 | 41.4217 | 12.5974 | 1.5000 |
| d13 | 25.7230 | 13.9366 | 2.0000 |
| d25 | 1.4000 | 7.0507 | 3.9102 |
| d29 | 2.6253 | 11.1011 | 12.6566 |
| Entrance pupil position | 27.5269 | 95.3206 | 360.1614 |
| Exit pupil position | −160.1098 | −270.9432 | −148.2760 |
| Front principal point position | 36.1475 | 128.7955 | 337.8089 |
| Rear principal point position | 133.0938 | 103.0945 | −26.4932 |
| Aperture diameter | 5.249 | 5.249 | 5.892 |

TABLE 3B

Single Lens Data

| Lens element | Start surface | Focal length |
|---|---|---|
| 1 | 1 | −122.8473 |
| 2 | 3 | 85.4610 |
| 3 | 5 | 106.4638 |
| 4 | 7 | −17.2733 |
| 5 | 9 | −21.9320 |
| 6 | 11 | 27.3059 |

TABLE 3B-continued

Single Lens Data

| Lens element | Start surface | Focal length |
|---|---|---|
| 7 | 14 | 19.6200 |
| 8 | 16 | 15.7620 |
| 9 | 18 | −6.8440 |
| 10 | 20 | 14.5086 |
| 11 | 22 | −33.6251 |
| 12 | 24 | 63.9190 |
| 13 | 26 | 16.4431 |
| 14 | 28 | −8.3995 |
| 15 | 30 | 14.5609 |
| 16 | 32 | −25.7688 |

TABLE 3C

Zoom Lens Group Data

| Lens group | Start surface | Focal length | Lens group length | Front principal point position | Rear principal point position |
|---|---|---|---|---|---|
| 1 | 1 | 79.04524 | 13.32500 | 2.96423 | 7.96457 |
| 2 | 7 | −15.38815 | 13.52760 | 0.63020 | 2.99872 |
| 3 | 14 | 23.59835 | 21.16000 | 3.17903 | 5.16101 |
| 4 | 26 | −17.92968 | 3.83500 | 2.51126 | 4.05728 |
| 5 | 30 | 29.48663 | 17.62500 | 0.69392 | 4.82353 |

TABLE 3D

Zoom Lens Group Magnification

| Lens group | Start surface | Wide-angle limit | Middle position | Telephoto limit |
|---|---|---|---|---|
| 1 | 1 | 0.00000 | 0.00000 | 0.00000 |
| 2 | 7 | −0.27097 | −0.50777 | −2.70639 |
| 3 | 14 | −0.30722 | −0.59225 | −0.46597 |
| 4 | 26 | 2.56444 | 3.03060 | 3.11509 |
| 5 | 30 | 0.54164 | 0.54281 | 0.54322 |

Numerical Example 2

The zoom lens system in Numerical Example 2 corresponds to that of the second exemplary embodiment illustrated in FIG. 3. With respect to the zoom lens system in Numerical Example 2, surface data are shown in Table 4, aspherical surface data are shown in Table 5, and various data in an infinity focus state are shown in Tables 6A through 6D.

TABLE 4

Surface Data
Unit: mm

| Surface number | r | d | nd | vd | dPgF |
|---|---|---|---|---|---|
| Object surface | ∞ | | | | |
| 1 | 90.03220 | 1.50000 | 1.90366 | 31.3 | 0.0028 |
| 2 | 48.91830 | 0.00500 | 1.56732 | 42.8 | |
| 3 | 48.91830 | 7.07000 | 1.59282 | 68.6 | 0.0194 |
| 4 | 2233.02330 | 0.15000 | | | |
| 5 | 47.72910 | 4.75000 | 1.59282 | 68.6 | 0.0194 |
| 6 | 205.66560 | Variable | | | |
| 7 | 970.40980 | 1.00000 | 1.95375 | 32.3 | 0.0000 |
| 8 | 15.05160 | 7.44000 | | | |
| 9* | −25.08120 | 1.20000 | 1.80525 | 40.9 | −0.0066 |
| 10* | 64.06410 | 0.32000 | | | |
| 11 | 40.87560 | 3.54000 | 1.94595 | 18.0 | 0.0386 |
| 12 | −66.94380 | Variable | | | |
| 13 (Aperture) | ∞ | Variable | | | |
| 14* | 14.02680 | 4.60000 | 1.77182 | 49.6 | −0.0070 |
| 15* | 300.00000 | 0.84000 | | | |
| 16 | 17.16660 | 4.40000 | 1.49700 | 81.6 | 0.0375 |
| 17 | −13.97690 | 0.00500 | 1.56732 | 42.8 | |
| 18 | −13.97690 | 0.50000 | 1.88300 | 40.8 | −0.0094 |
| 19 | 11.50680 | 2.04000 | | | |
| 20 | 18.93490 | 3.35000 | 1.55032 | 75.5 | 0.0194 |
| 21 | −19.04310 | 0.00500 | 1.56732 | 42.8 | |
| 22 | −19.04310 | 0.50000 | 1.84666 | 23.8 | 0.0137 |
| 23 | −37.18080 | 1.31000 | | | |
| 24* | 35.16700 | 1.79000 | 1.68820 | 31.1 | 0.0074 |
| 25* | 2000 | Variable | | | |
| 26* | 67.71940 | 2.76000 | 1.68820 | 31.1 | 0.0074 |
| 27 | −17.46970 | 0.00500 | 1.56732 | 42.8 | |
| 28 | −17.46970 | 0.50000 | 1.80420 | 46.5 | −0.0066 |
| 29 | 14.97090 | Variable | | | |
| 30* | 49.63090 | 4.65000 | 1.80525 | 40.9 | −0.0066 |
| 31* | −28.90890 | 2.10000 | | | |
| 32 | −15.69750 | 0.80000 | 1.94595 | 18.0 | 0.0386 |
| 33 | −43.25390 | Variable | | | |
| 34 | −45.18490 | 3.50000 | 1.80518 | 25.5 | 0.0132 |
| 35 | −18.65680 | 7.17000 | | | |
| 36 | ∞ | 2.30000 | 1.51680 | 64.2 | 0.0016 |
| 37 | ∞ | BF | | | |
| Image surface | ∞ | | | | |

TABLE 5

Aspherical Surface Data

Surface No. 9

K = 3.11214E+00, A4 = 1.03212E−04, A6 = −1.31145E−06,
A8 = 1.23002E−08, A10 = −2.79090E−11, A12 = 0.00000E+00

Surface No. 10

K = 0.00000E+00, A4 = 6.91586E−05, A6 = −1.35742E−06,
A8 = 1.23152E−08, A10 = −3.90378E−11, A12 = 0.00000E+00

Surface No. 14

K = 8.65812E−01, A4 = −4.64753E−05, A6 = 1.29015E−08,
A8 = −5.80993E−09, A10 = 5.71598E−11, A12 = −4.69710E−13

Surface No. 15

K = 0.00000E+00, A4 = −1.62558E−05, A6 = 3.57810E−07,
A8 = −3.56827E−09, A10 = 3.35366E−11, A12 = 9.45027E−14

Surface No. 24

K = 0.00000E+00, A4 = −5.19668E−05, A6 = −1.43251E−06,
A8 = 4.42560E−08, A10 = −6.32611E−10, A12 = −5.93428E−21

Surface No. 25

K = 0.00000E+00, A4 = −3.12527E−05, A6 = −1.54883E−06,
A8 = 4.68541E−08, A10 = −6.31412E−10, A12 = 0.00000E+00

Surface No. 26

K = 0.00000E+00, A4 = 2.40700E−06, A6 = −2.68502E−07,
A8 = 1.30694E−08, A10 = −1.59341E−10, A12 = −3.94376E−13

Surface No. 30

K = 0.00000E+00, A4 = −1.72449E−05, A6 = 6.24338E−07,
A8 = −1.10034E−08, A10 = 3.99473E−11, A12 = −1.42440E−14

Surface No. 31

K = 0.00000E+00, A4 = −3.75306E−05, A6 = 5.73499E−07,
A8 = −1.03570E−08, A10 = 3.39158E−11, A12 = 3.30389E−20

Various Data in an Infinity Focus State

TABLE 6A

Various Data
Zoom Ratio: 18.45505

| | Wide-angle limit | Middle position | Telephoto limit |
|---|---|---|---|
| Focal length | 9.1400 | 39.2679 | 168.6786 |
| F-number | 2.92024 | 4.19501 | 4.68004 |
| Angel of view | 41.1653 | 11.4924 | 2.6859 |
| Image height | 6.8100 | 7.9180 | 7.9180 |
| Total length of the zoom lens system | 142.2000 | 142.2000 | 142.2000 |
| BF | 0.69570 | 0.66342 | 0.68575 |
| d6 | 1.1160 | 27.7650 | 51.0844 |
| d12 | 39.2184 | 16.0845 | 1.5000 |
| d13 | 26.5397 | 10.3248 | 2.0000 |
| d25 | 1.4000 | 6.5242 | 4.3458 |
| d29 | 2.4482 | 5.6836 | 11.8028 |
| d33 | 0.6975 | 5.0376 | 0.6869 |
| Entrance pupil position | 27.1056 | 100.7673 | 363.5926 |
| Exit pupil position | 1004.5773 | −286.2484 | −260.8680 |
| Front principal point position | 36.3288 | 134.6608 | 423.4887 |
| Rear principal point position | 133.0755 | 102.9153 | −26.4729 |
| Aperture diameter | 5.249 | 5.892 | 5.892 |

TABLE 6B

Single Lens Data

| Lens element | Start surface | Focal length |
|---|---|---|
| 1 | 1 | −120.6323 |
| 2 | 3 | 84.2641 |
| 3 | 5 | 103.6817 |
| 4 | 7 | −16.0384 |
| 5 | 9 | −22.2502 |
| 6 | 11 | 27.2646 |
| 7 | 14 | 18.9324 |
| 8 | 16 | 16.2644 |
| 9 | 18 | −7.0821 |
| 10 | 20 | 17.8101 |
| 11 | 22 | −46.6968 |
| 12 | 24 | 51.9953 |
| 13 | 26 | 20.4491 |
| 14 | 28 | −9.9565 |
| 15 | 30 | 23.3017 |
| 16 | 32 | −26.4204 |
| 17 | 34 | 37.2732 |

TABLE 6C

Zoom Lens Group Data

| Lens group | Start surface | Focal length | Lens group length | Front principal point position | Rear principal point position |
|---|---|---|---|---|---|
| 1 | 1 | 77.47304 | 13.47500 | 2.87123 | 7.93690 |
| 2 | 7 | −14.81805 | 13.50000 | 0.36201 | 2.46283 |
| 3 | 14 | 23.17490 | 19.34000 | 1.99025 | 4.77766 |
| 4 | 26 | −20.35229 | 3.26500 | 2.31891 | 3.62474 |
| 5 | 30 | 103.38087 | 7.55000 | −9.42626 | −5.68808 |
| 6 | 34 | 37.27323 | 12.97000 | 3.11889 | 5.57144 |

TABLE 6D

Zoom Lens Group Magnification

| Lens group | Start surface | Wide-angle limit | Middle position | Telephoto limit |
|---|---|---|---|---|
| 1 | 1 | 0.00000 | 0.00000 | 0.00000 |
| 2 | 7 | −0.26633 | −0.51115 | −2.61318 |
| 3 | 14 | −0.31159 | −0.59955 | −0.49421 |
| 4 | 26 | 2.47070 | 3.04293 | 2.92790 |
| 5 | 30 | 0.73502 | 0.69355 | 0.73528 |
| 6 | 34 | 0.78284 | 0.78371 | 0.78311 |

Numerical Example 3

The zoom lens system in Numerical Example 3 corresponds to that of the third exemplary embodiment illustrated in FIG. 5. With respect to the zoom lens system in Numerical Example 3, surface data are shown in Table 7, aspherical surface data are shown in Table 8, and various data in an infinity focus state are shown in Tables 9A through 9D.

TABLE 7

Surface Data
Unit: mm

| Surface number | r | d | nd | vd | dPgF |
|---|---|---|---|---|---|
| Object surface | ∞ | | | | |
| 1 | 118.91520 | 1.50000 | 2.00069 | 25.5 | 0.0111 |
| 2 | 48.15980 | 0.00500 | 1.56732 | 42.8 | |
| 3 | 48.15980 | 8.38000 | 1.59282 | 68.6 | 0.0194 |
| 4 | −300.51880 | 0.15000 | | | |
| 5 | 41.31130 | 4.81000 | 1.83481 | 42.7 | −0.0065 |
| 6 | 147.71150 | Variable | | | |
| 7 | −520.75950 | 1.00000 | 1.95375 | 32.3 | 0.0000 |
| 8 | 14.14330 | 7.75000 | | | |
| 9* | −17.04730 | 2.48000 | 1.80525 | 40.9 | −0.0066 |
| 10* | 82.00010 | 0.76500 | | | |
| 11 | 85.42160 | 4.47000 | 1.80809 | 22.8 | 0.0213 |
| 12 | −24.92240 | Variable | | | |
| 13 (Aperture) | ∞ | Variable | | | |
| 14* | 14.55050 | 5.07000 | 1.77182 | 49.6 | −0.0070 |
| 15* | 79.22470 | 0.50000 | | | |
| 16 | 16.18650 | 5.58000 | 1.49700 | 81.6 | 0.0375 |
| 17 | −15.16610 | 0.00500 | 1.56732 | 42.8 | |
| 18 | −15.16610 | 1.05000 | 1.88300 | 40.8 | −0.0094 |
| 19 | 11.41970 | 4.85000 | | | |
| 20 | 14.94510 | 6.00000 | 1.55032 | 75.5 | 0.0194 |
| 21 | −11.65920 | 0.00500 | 1.56732 | 42.8 | |
| 22 | −11.65920 | 0.69000 | 1.72916 | 54.7 | −0.0046 |
| 23 | −71.65370 | 0.50000 | | | |
| 24* | 36.45130 | 1.80000 | 1.58332 | 59.3 | 0.0211 |
| 25* | 8648.69050 | Variable | | | |
| 26* | −307.06250 | 2.21000 | 1.80525 | 40.9 | −0.0066 |
| 27 | −35.90880 | 0.00500 | 1.56732 | 42.8 | |
| 28 | −35.90880 | 0.50000 | 1.88300 | 40.8 | −0.0094 |
| 29 | 27.47700 | Variable | | | |
| 30* | 24.89110 | 7.00000 | 1.58332 | 59.3 | 0.0211 |
| 31 | −23.13330 | 0.00500 | 1.56732 | 42.8 | |
| 32 | −23.13330 | 0.84000 | 2.00272 | 19.3 | 0.0315 |
| 33 | −29.80860 | 7.67000 | | | |
| 34 | ∞ | 2.30000 | 1.51680 | 64.2 | 0.0016 |
| 35 | ∞ | BF | | | |
| Image surface | ∞ | | | | |

TABLE 8

Aspherical Surface Data

Surface No. 9

K = 8.68176E-01, A4 = 5.82154E-05, A6 = -2.40851E-07,
A8 = 2.14156E-09, A10 = 7.40819E-12, A12 = 0.00000E+00

Surface No. 10

K = 0.00000E+00, A4 = 1.16858E-05, A6 = -3.34355E-07,
A8 = 2.68206E-09, A10 = -7.59284E-12, A12 = 0.00000E+00

Surface No. 14

K = 5.51846E-01, A4 = -3.15921E-05, A6 = -2.00178E-08,
A8 = -3.44800E-09, A10 = 2.60639E-11, A12 = -3.18151E-13

Surface No. 15

K = 0.00000E+00, A4 = -2.43759E-05, A6 = 7.41730E-08,
A8 = -2.54399E-09, A10 = -4.52381E-12, A12 = 0.00000E+00

Surface No. 24

K = 0.00000E+00, A4 = -1.13050E-04, A6 = -4.42370E-07,
A8 = -1.30601E-08, A10 = 3.04322E-10, A12 = 0.00000E+00

Surface No. 25

K = 0.00000E+00, A4 = -6.13601E-05, A6 = -4.43782E-07,
A8 = -9.69475E-09, A10 = 2.67283E-10, A12 = 0.00000E+00

Surface No. 26

K = 0.00000E+00, A4 = -7.18844E-06, A6 = -1.76233E-07,
A8 = 4.72759E-09, A10 = -3.74715E-11, A12 = 0.00000E+00

Surface No. 30

K = 0.00000E+00, A4 = -8.43721E-06, A6 = 2.69869E-08,
A8 = -2.75257E-10, A10 = 4.17520E-13, A12 = 0.00000E+00

Various Data in an Infinity Focus State

TABLE 9A

Various Data
Zoom Ratio: 13.11480

| | Wide-angle limit | Middle position | Telephoto limit |
|---|---|---|---|
| Focal length | 9.1500 | 33.1323 | 120.0004 |
| F-number | 2.92040 | 4.25046 | 4.74996 |
| Angel of view | 41.1735 | 13.5260 | 3.7886 |
| Image height | 6.8100 | 7.9180 | 7.9180 |
| Total length of the zoom lens system | 150.0000 | 150.0000 | 150.0000 |
| BF | 0.68278 | 0.68634 | 0.60057 |
| d6 | 1.4973 | 18.0351 | 33.6992 |
| d12 | 44.4938 | 21.6480 | 1.5000 |
| d13 | 17.7411 | 5.0000 | 2.0000 |
| d25 | 3.3643 | 9.7784 | 14.3237 |
| d29 | 4.3131 | 16.9483 | 19.8869 |
| Entrance pupil position | 26.8776 | 71.2651 | 183.3567 |
| Exit pupil position | 458.0045 | 92.1305 | 74.2569 |
| Front principal point position | 36.2107 | 116.4020 | 498.8611 |
| Rear principal point position | 140.8324 | 116.8538 | 29.8999 |
| Aperture diameter | 6.111 | 6.911 | 7.458 |

TABLE 9B

Single Lens Data

| Lens element | Start surface | Focal length |
|---|---|---|
| 1 | 1 | -81.7506 |
| 2 | 3 | 70.6492 |
| 3 | 5 | 67.3149 |
| 4 | 7 | -14.4239 |
| 5 | 9 | -17.3330 |
| 6 | 11 | 24.3156 |
| 7 | 14 | 22.3310 |
| 8 | 16 | 16.7436 |
| 9 | 18 | -7.2435 |
| 10 | 20 | 12.9371 |
| 11 | 22 | -19.1904 |
| 12 | 24 | 62.7490 |
| 13 | 26 | 50.3159 |
| 14 | 28 | -17.5636 |
| 15 | 30 | 21.7212 |
| 16 | 32 | -109.9486 |

TABLE 9C

Zoom Lens Group Data

| Lens group | Start surface | Focal length | Lens group length | Front principal point position | Rear principal point position |
|---|---|---|---|---|---|
| 1 | 1 | 59.71461 | 14.84500 | 4.95050 | 11.00164 |
| 2 | 7 | -14.29010 | 16.46500 | -0.90580 | -0.74990 |
| 3 | 14 | 28.78304 | 26.05000 | 3.95024 | 5.18841 |
| 4 | 26 | -26.97300 | 2.71500 | 1.36692 | 2.59441 |
| 5 | 30 | 26.85688 | 17.81500 | 2.25206 | 5.76307 |

TABLE 9D

Zoom Lens Group Magnification

| Lens group | Start surface | Wide-angle limit | Middle position | Telephoto limit |
|---|---|---|---|---|
| 1 | 1 | 0.00000 | 0.00000 | 0.00000 |
| 2 | 7 | -0.34863 | -0.43234 | -0.58442 |
| 3 | 14 | -0.38954 | -0.51438 | -0.69071 |
| 4 | 26 | 2.14574 | 2.48260 | 2.61465 |
| 5 | 30 | 0.52583 | 0.52809 | 0.52570 |

Numerical Example 4

The zoom lens system in Numerical Example 4 corresponds to that of the fourth exemplary embodiment illustrated in FIG. 7. With respect to the zoom lens system in Numerical Example 4, surface data are shown in Table 10, aspherical surface data are shown in Table 11, and various data in an infinity focus state are shown in Tables 12A through 12D.

TABLE 10

Surface Data
Unit: mm

| Surface number | r | d | nd | vd | dPgF |
|---|---|---|---|---|---|
| Object surface | ∞ | | | | |
| 1 | 102.66720 | 1.50000 | 1.90366 | 31.3 | 0.0028 |
| 2 | 54.15830 | 0.00500 | 1.56732 | 42.8 | |
| 3 | 54.15830 | 6.06000 | 1.59282 | 68.6 | 0.0194 |
| 4 | 455.74670 | 0.15000 | | | |
| 5 | 55.92200 | 4.64000 | 1.59282 | 68.6 | 0.0194 |
| 6 | 276.57860 | Variable | | | |

TABLE 10-continued

Surface Data
Unit: mm

| Surface number | r | d | nd | vd | dPgF |
|---|---|---|---|---|---|
| 7 | 362.53850 | 1.00000 | 1.80420 | 46.5 | −0.0066 |
| 8 | 15.53890 | 9.26000 | | | |
| 9* | −24.86660 | 1.20000 | 1.80525 | 40.9 | −0.0066 |
| 10* | 925.35220 | 0.47000 | | | |
| 11 | 168.14910 | 2.62000 | 1.94595 | 18.0 | 0.0386 |
| 12 | −59.37830 | Variable | | | |
| 13 (Aperture) | ∞ | Variable | | | |
| 14* | 16.84470 | 4.82000 | 1.77182 | 49.6 | −0.0070 |
| 15* | 171.85630 | 0.50000 | | | |
| 16 | 16.90420 | 5.58000 | 1.49700 | 81.6 | 0.0375 |
| 17 | −18.42510 | 0.00500 | 1.56732 | 42.8 | |
| 18 | −18.42510 | 0.50000 | 1.88300 | 40.8 | −0.0094 |
| 19 | 12.41700 | 1.62000 | | | |
| 20 | 14.60220 | 4.25000 | 1.55032 | 75.5 | 0.0194 |
| 21 | −25.31980 | 0.00500 | 1.56732 | 42.8 | |
| 22 | −25.31980 | 0.50000 | 1.70154 | 41.1 | 0.0028 |
| 23 | −32.05340 | 0.50000 | | | |
| 24* | 20.58490 | 1.80000 | 1.58332 | 59.3 | 0.0211 |
| 25* | 55.00040 | Variable | | | |
| 26* | 102.41440 | 3.50000 | 1.68820 | 31.1 | 0.0074 |
| 27 | −10.35580 | 0.00500 | 1.56732 | 42.8 | |
| 28 | −10.35580 | 0.50000 | 1.88300 | 40.8 | −0.0094 |
| 29 | 11.02720 | Variable | | | |
| 30* | 22.33410 | 7.00000 | 1.58332 | 59.3 | 0.0211 |
| 31 | −20.24260 | 0.00500 | 1.56732 | 42.8 | |
| 32 | −20.24260 | 0.80000 | 2.00272 | 19.3 | 0.0315 |
| 33 | −27.07790 | 7.67000 | | | |
| 34 | ∞ | 2.30000 | 1.51680 | 64.2 | 0.0016 |
| 35 | ∞ | BF | | | |
| Image surface | ∞ | | | | |

TABLE 11

Aspherical Surface Data

Surface No. 9

K = 2.17658E+00, A4 = 4.14241E−05, A6 = −5.24569E−07,
A8 = 4.69427E−09, A10 = −8.51486E−12, A12 = 0.00000E+00

Surface No. 10

K = 0.00000E+00, A4 = 1.32379E−05, A6 = −5.41659E−07,
A8 = 4.55152E−09, A10 = −1.19233E−11, A12 = 0.00000E+00

Surface No. 14

K = 1.00000E+00, A4 = −2.14193E−05, A6 = −5.29658E−08,
A8 = −2.44066E−09, A10 = 2.13248E−11, A12 = −1.23757E−13

Surface No. 15

K = 0.00000E+00, A4 = 4.78921E−06, A6 = −2.56278E−08,
A8 = −7.12359E−10, A10 = 1.03042E−11, A12 = 0.00000E+00

Surface No. 24

K = 0.00000E+00, A4 = −3.58356E−05, A6 = −7.01419E−07,
A8 = −1.81032E−08, A10 = 8.20851E−11, A12 = 0.00000E+00

Surface No. 25

K = 0.00000E+00, A4 = 2.01250E−05, A6 = −5.67060E−07,
A8 = −1.92568E−08, A10 = 1.43914E−10, A12 = 0.00000E+00

Surface No. 26

K = 0.00000E+00, A4 = 6.67894E−05, A6 = 3.51584E−07,
A8 = 8.03864E−09, A10 = 2.29687E−11, A12 = 0.00000E+00

Surface No. 30

K = 0.00000E+00, A4 = 6.76190E−06, A6 = 5.80483E−08,
A8 = −7.53347E−10, A10 = 1.91750E−12, A12 = 0.00000E+00

Various Data in an Infinity Focus State

TABLE 12A

Various Data
Zoom Ratio: 13.50600

| | Wide-angle limit | Middle position | Telephoto limit |
|---|---|---|---|
| Focal length | 8.8850 | 32.6464 | 120.0008 |
| F-number | 2.92047 | 4.25039 | 4.68057 |
| Angel of view | 42.0566 | 14.2407 | 3.8093 |
| Image height | 6.8100 | 7.9180 | 7.9180 |
| Total length of the zoom lens system | 150.0000 | 150.0000 | 150.0000 |
| BF | 0.71089 | 0.75370 | 0.66167 |
| d6 | 0.8158 | 27.6461 | 53.0378 |
| d12 | 51.5782 | 24.1325 | 1.5000 |
| d13 | 23.1912 | 8.1117 | 2.0000 |
| d25 | 1.5148 | 4.5110 | 11.3984 |
| d29 | 3.4347 | 16.1334 | 12.5987 |
| Entrance pupil position | 27.9910 | 86.9197 | 212.1081 |
| Exit pupil position | −101.0008 | 240.5118 | −370.1147 |
| Front principal point position | 36.0999 | 124.0113 | 293.2709 |
| Rear principal point position | 141.1256 | 117.4070 | 29.9607 |
| Aperture diameter | 5.921 | 6.615 | 7.351 |

TABLE 12B

Single Lens Data

| Lens element | Start surface | Focal length |
|---|---|---|
| 1 | 1 | −128.7340 |
| 2 | 3 | 103.0978 |
| 3 | 5 | 117.3202 |
| 4 | 7 | −20.2134 |
| 5 | 9 | −30.0555 |
| 6 | 11 | 46.6510 |
| 7 | 14 | 23.8729 |
| 8 | 16 | 18.7201 |
| 9 | 18 | −8.3374 |
| 10 | 20 | 17.4895 |
| 11 | 22 | −177.2298 |
| 12 | 24 | 55.3305 |
| 13 | 26 | 13.8409 |
| 14 | 28 | −5.9825 |
| 15 | 30 | 19.3772 |
| 16 | 32 | −84.9509 |

TABLE 12C

Zoom Lens Group Data

| Lens group | Start surface | Focal length | Lens group length | Front principal point position | Rear principal point position |
|---|---|---|---|---|---|
| 1 | 1 | 98.05053 | 12.35500 | 2.33167 | 6.99820 |
| 2 | 7 | −16.056988 | 14.55000 | 1.38502 | 3.51545 |
| 3 | 14 | 20.06421 | 20.08000 | 5.02523 | 7.75893 |
| 4 | 26 | −10.98501 | 4.00500 | 2.49853 | 4.12418 |
| 5 | 30 | 24.73414 | 17.77500 | 2.18440 | 5.65349 |

TABLE 12D

Zoom Lens Group Magnification

| Lens group | Start surface | Wide-angle limit | Middle position | Telephoto limit |
|---|---|---|---|---|
| 1 | 1 | 0.00000 | 0.00000 | 0.00000 |
| 2 | 7 | −0.21571 | −0.33729 | −0.72283 |
| 3 | 14 | −0.22223 | −0.40361 | −0.73877 |
| 4 | 26 | 3.92837 | 5.10126 | 4.74332 |
| 5 | 30 | 0.48119 | 0.47946 | 0.48318 |

Corresponding Values of Conditions

Table 13 below shows corresponding values of conditions for the zoom lens systems in the Numerical Examples.

TABLE 13

|  | Numerical Example 1 | Numerical Example 2 | Numerical Example 3 | Numerical Example 4 |
|---|---|---|---|---|
| Condition (1) | 8.65 | 8.47 | 6.53 | 11.04 |
| Condition (2) | 1.96 | 2.23 | 2.95 | 1.24 |
| Condition (3) | 0.38 | 0.40 | 0.29 | 0.31 |
| Condition (4) | 0.60 | 0.61 | 0.76 | 0.62 |
| Condition (5) | 0.0194 | 0.0194 | 0.0194 | 0.0194 |
| Condition (6) | 0.0194 | 0.0194 | −0.0062 | 0.0194 |

A zoom lens system according to the present disclosure is applicable, for example, to digital still cameras, interchangeable lens digital cameras, digital video cameras, cameras for mobile phones, cameras for personal digital assistants (PDAs), security cameras for security systems, web cameras, and vehicle cameras, and is particularly suitable for imaging optical systems that are required to provide a high image quality, such as digital still camera systems and digital video camera systems.

What is claimed is:

1. A zoom lens system comprising, in order from an object side to an image side:
   a first lens group having a positive power;
   a second lens group having a negative power;
   an aperture stop;
   a third lens group having a positive power; and
   a fourth lens group having a negative power,
   wherein, during zooming, a total length of the zoom lens system does not change, while a distance along an optical axis between each adjacent two of the first through fourth lens groups changes, and a physical location of the aperture stop moves along the optical axis independently of the second lens group and the third lens group, and
   wherein the zoom lens system satisfies the following conditions (1) and (2):

$$6.0 < f1/fw < 20.0 \quad (1)$$

$$0.5 < |f4|/fw < 4.0 \quad (2)$$

where
   f1 is a focal length of the first lens group,
   f4 is a focal length of the fourth lens group, and
   fw is a focal length of the zoom lens system at a wide-angle limit.

2. The zoom lens system according to claim 1, satisfying the following condition (3):

$$D13w/(D12w+D13w) > 0.15 \quad (3)$$

where
   D12w is a distance along the optical axis between (i) the second lens group and (ii) the aperture stop at the wide-angle limit, and
   D13w is a distance along the optical axis between (i) the aperture stop and the (ii) third lens group at the wide-angle limit.

3. The zoom lens system according to claim 1, satisfying the following condition (4):

$$T21t/T21w < 1.0 \quad (4)$$

where
   T21t is a distance along the optical axis between the second lens group and (ii) an image surface at a telephoto limit, and
   T21w is a distance along the optical axis between (i) the second lens group and (ii) the image surface at the wide-angle limit.

4. The zoom lens system according to claim 1, wherein at least one lens element included in lens groups that are disposed on the image side than the aperture stop moves along the optical axis during focusing.

5. The zoom lens system according to claim 1, wherein a lens group that is disposed closest to an image surface does not move relative to the image surface during zooming.

6. The zoom lens system according to claim 1, wherein the first lens group comprises, in order from the object side to the image side:
   a first lens element having a negative power;
   a second lens element having a positive power; and
   a third lens element having a positive power, and
   wherein the first lens group satisfies the following condition (5):

$$dPgF2 > 0.005 \quad (5)$$

where dPgF2 is an anomalous dispersion of g-line and F-line of the second lens element.

7. The zoom lens system according to claim 6, satisfying the following condition (6):

$$dPgF3 > 0.005 \quad (6)$$

where dPgF3 is an anomalous dispersion of g-line and F-line of the third lens element.

8. An imaging apparatus comprising:
   a zoom lens system that forms an optical image of an object; and
   an image sensor that converts the optical image formed by the zoom lens system to an electrical image signal,
   wherein the zoom lens system comprises, in order from an object side to an image side:
   a first lens group having a positive power;
   a second lens group having a negative power;
   an aperture stop;
   a third lens group having a positive power; and
   a fourth lens group having a negative power,
   wherein, during zooming, a total length of the zoom lens system does not change, while a distance along an optical axis between each adjacent two of the first through fourth lens groups changes, and a physical location the aperture stop moves along the optical axis independently of the second lens group and the third lens group, and
   wherein the zoom lens system satisfies the following conditions (1) and (2):

$$6.0 < f1/fw < 20.0 \quad (1)$$

$$0.5 < |f4|/fw < 4.0 \quad (2)$$

where
- f1 is a focal length of the first lens group,
- f4 is a focal length of the fourth lens group, and
- fw is a focal length of the zoom lens system at a wide-angle limit.

9. A camera comprising:
- a zoom lens system that forms an optical image of an object; and
- an image sensor that converts the optical image formed by the zoom lens system to an electrical image signal,
- wherein the zoom lens system comprises, in order from an object side to an image side:
- a first lens group having a positive power;
- a second lens group having a negative power;
- an aperture stop;
- a third lens group having a positive power; and
- a fourth lens group having a negative power,
- wherein, during zooming, a total length of the zoom lens system does not change, while a distance along an optical axis between each adjacent two of the first through fourth lens groups changes, and a physical location of the aperture stop moves along the optical axis independently of the second lens group and the third lens group,
- wherein the zoom lens system satisfies the following conditions (1) and (2):

$$6.0 < f1/fw < 20.0 \quad (1)$$

$$0.5 < |f4|/fw < 4.0 \quad (2)$$

where
- f1 is a focal length of the first lens group,
- f4 is a focal length of the fourth lens group, and
- fw is a focal length of the zoom lens system at a wide-angle limit, and
- wherein the camera performs at least one of displaying and recoding of the image signal converted by the image sensor.

10. The zoom lens system according to claim 1, wherein during zooming, the physical location of the aperture stop moves along the optical axis to form a locus which is different from the second lens group and the third lens group.

11. The zoom lens system according to claim 1, wherein while a distance between each adjacent two of the first through fourth lens groups changes in order that the distance at a telephoto end is smaller than the distance at a wide-angle end, and the physical location of the aperture stop moves along the optical axis to form a locus which is different from the second lens group and the third lens group.

12. The zoom lens system according to claim 1, wherein, during zooming, a distance between the fourth lens group and the fifth lens group becomes larger at a telephoto end than the distance at a wide-angle end.

* * * * *